(12) United States Patent
Ikeda

(10) Patent No.: US 8,237,815 B2
(45) Date of Patent: Aug. 7, 2012

(54) IMAGE PROCESSING APPARATUS, CONTROL METHOD THEREFOR, FOR SUPPRESSING DETERIORATION OF IMAGE QUALITY CAUSED BY A FOREIGN SUBSTANCE

(75) Inventor: Yasuyuki Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 506 days.

(21) Appl. No.: 12/539,382

(22) Filed: Aug. 11, 2009

(65) Prior Publication Data

US 2010/0053357 A1 Mar. 4, 2010

(30) Foreign Application Priority Data

Aug. 29, 2008 (JP) .................................. 2008-222791

(51) Int. Cl.
*H04N 5/76* (2006.01)
*H04N 5/217* (2011.01)
(52) U.S. Cl. .................. 348/231.3; 348/222.1; 348/241; 348/333.02
(58) Field of Classification Search ............... 348/231.3, 348/241
See application file for complete search history.

(56) References Cited

U.S. PATENT DOCUMENTS

| | | | |
|---|---|---|---|
| 5,438,374 A | 8/1995 | Yan | |
| 6,940,550 B2 * | 9/2005 | Kitawaki et al. | 348/246 |
| 7,349,014 B2 * | 3/2008 | Higashihara | 348/241 |
| 7,365,788 B2 | 4/2008 | Ito | |
| 7,853,097 B2 * | 12/2010 | Ishiga | 382/275 |
| 7,990,419 B2 * | 8/2011 | Kotani | 348/207.99 |
| 7,991,241 B2 * | 8/2011 | Kusama | 382/254 |
| 8,035,699 B2 * | 10/2011 | Ikeda | 348/231.1 |
| 8,089,536 B2 * | 1/2012 | Kotani | 348/246 |
| 2002/0093577 A1 | 7/2002 | Kitawaki et al. | |
| 2004/0252768 A1 | 12/2004 | Suzuki et al. | |
| 2008/0055433 A1 | 3/2008 | Steinberg et al. | |

FOREIGN PATENT DOCUMENTS

| | | |
|---|---|---|
| EP | 1809020 A | 7/2007 |
| JP | 06-105241 A | 4/1994 |
| JP | 2001-223894 A | 8/2001 |
| JP | 2003-289495 A | 10/2003 |

(Continued)

OTHER PUBLICATIONS

XP-002563625, Removal of Image Artifacts Due to Sensor Dust, Stephen Lin, Changyin Zhou, 2007.

(Continued)

*Primary Examiner* — Ngoc-Yen Vu
(74) *Attorney, Agent, or Firm* — Cowan, Liebowitz & Latman, P.C.

(57) ABSTRACT

An image processing apparatus which corrects, based on information of a foreign substance adhered to an optical element arranged in front of an image sensor in an image capturing apparatus, a shadow of the foreign substance in the moving image data generated by performing predictive encoding by referring to image data of a different input frame, the image processing apparatus comprises: a moving image decompression unit which decompresses an image of each frame by obtaining information representing a difference between frames from the moving image data; and a correction unit which corrects the information representing the difference between frames when the information representing the difference between frames that is obtained by the moving image decompression unit in correspondence with a region containing the shadow of the foreign substance represented by the foreign substance information is determined to be larger than a predetermined threshold.

9 Claims, 22 Drawing Sheets

FOREIGN PATENT DOCUMENTS

| | | |
|---|---|---|
| JP | 2004-242158 A | 8/2004 |
| JP | 2005-005844 A | 1/2005 |

OTHER PUBLICATIONS

XP-002563626, An Optic Model of the Appearance of Blemishes in Digital Photographs, Adrian Samfir, et al., 2007.

XP-000492740, Manipulation and Compositing of MC-DCT Compressed Video, Shih-Fu Chang. 8272 IEEE Journal on Selected Areas in Communications, Jan. 13, 1995, No. 1.

All of the above references were cited in a Feb. 1, 2010 European Search Report of the counterpart European Patent Application No. 09168961.2.

* cited by examiner

| PARAMETERS | SETTINGS |
|---|---|
| APERTURE VALUE | F22 |
| ISO | 400 |
| SHUTTER SPEED | 1/30 |
| PHOTOMETRY MODE | AVERAGE PHOTOMETRY |
| ELECTRONIC FLASH | INHIBITED |
| EXPOSURE COMPENSATION | INHIBITED |
| AF MODE | MANUAL |

FIG. 5

| ADDRESS OFFSET (Hex) | CODE (Hex) | MEANING |
|---|---|---|
| +00 | FF | Prefix |
| +01 | E0 | |
| +02 | | F-NUMBER (NUMERATOR) |
| +04 | | F-NUMBER (DENOMINATOR) |
| +06 | | LENS PUPIL POSITION (NUMERATOR) |
| +08 | | LENS PUPIL POSITION (DENOMINATOR) |
| +0A | | NUMBER OF DUST REGIONS |
| +0C | | PARAMETERS OF DUST REGION $D_1$<br>    RADIUS (2 BYTES)<br>        x-COORDINATE OF CENTER (2 BYTES)<br>        y-COORDINATE OF CENTER (2 BYTES) |
| | | PARAMETERS OF DUST REGION $D_2$ |
| | | . . . |
| | | PARAMETERS OF DUST REGION $D_n$ |

F I G. 11A
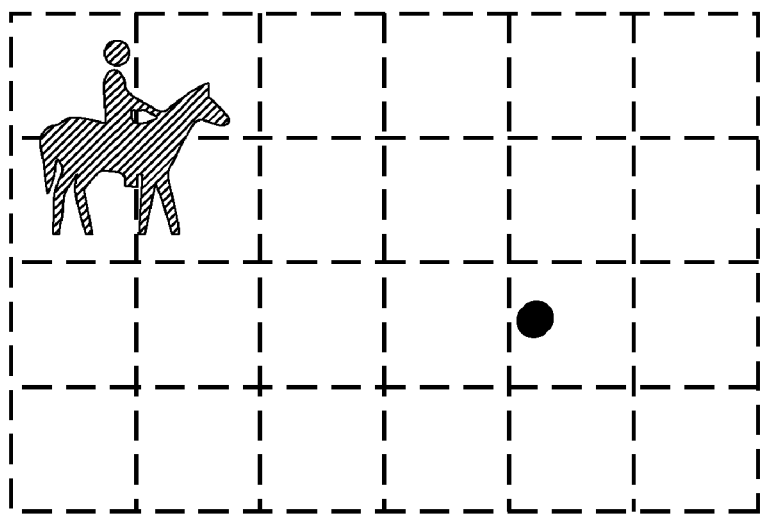
F I G. 11B
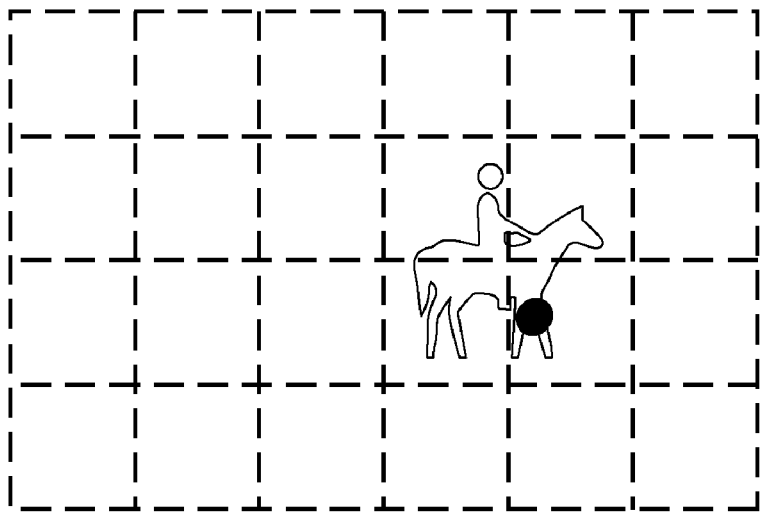
F I G. 11C
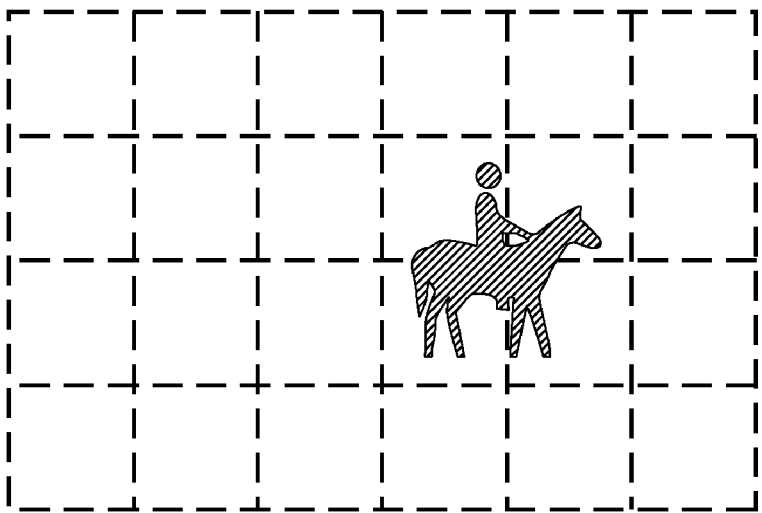

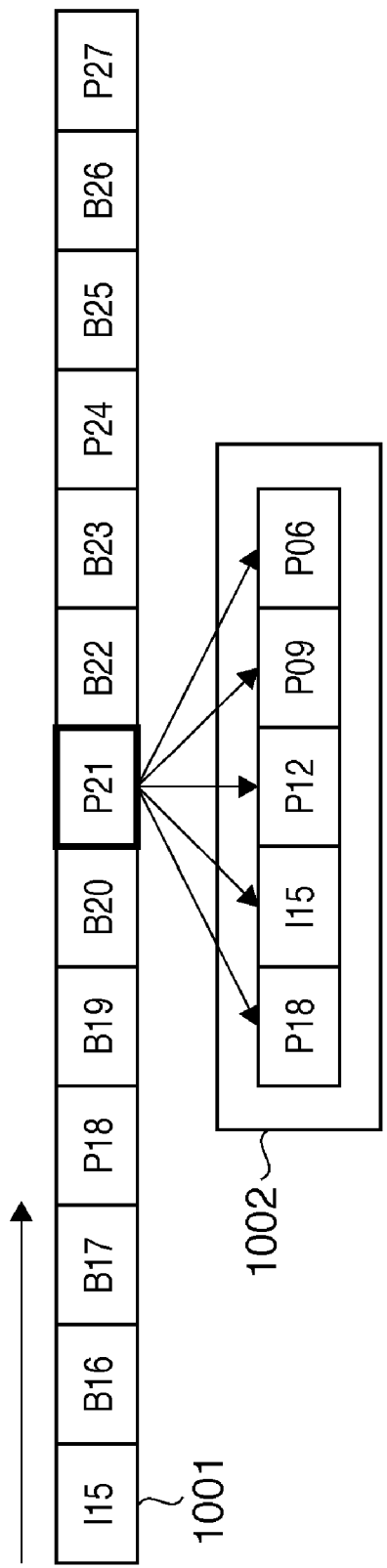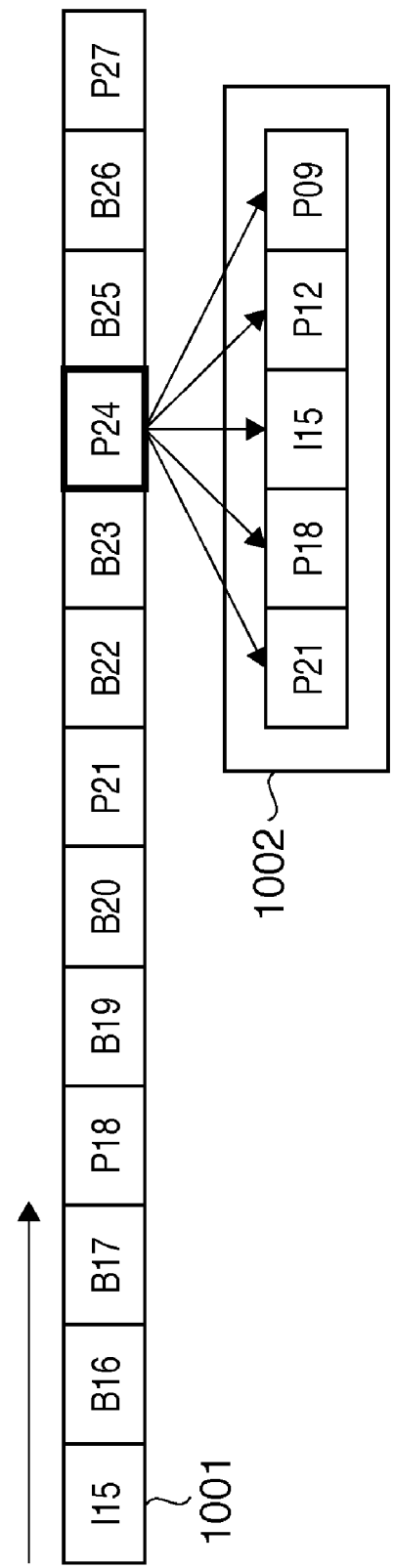

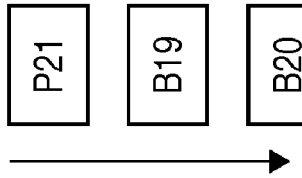

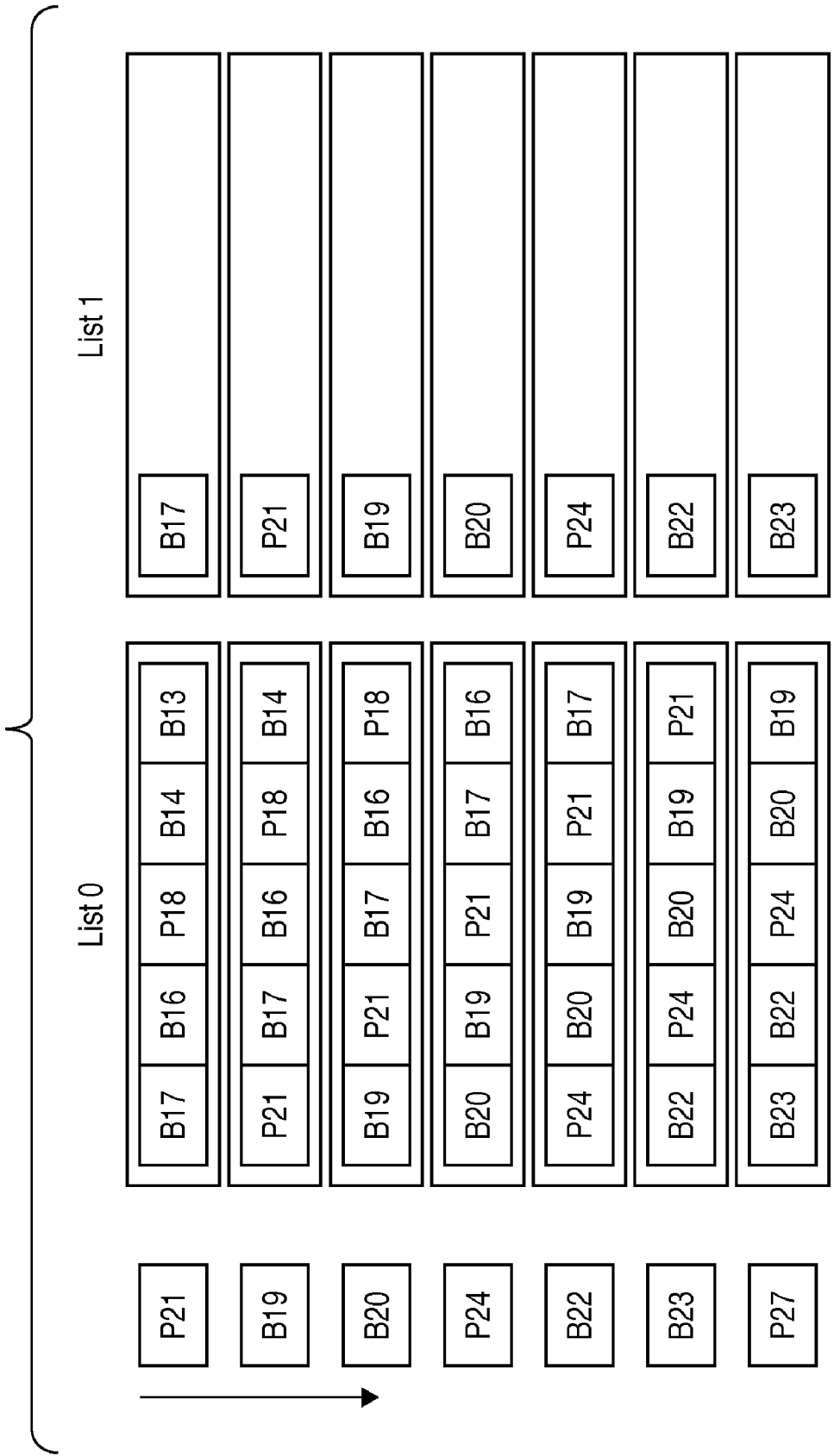

IMAGE PROCESSING APPARATUS, CONTROL METHOD THEREFOR, FOR SUPPRESSING DETERIORATION OF IMAGE QUALITY CAUSED BY A FOREIGN SUBSTANCE

BACKGROUND OF THE INVENTION

1. Field of the Invention

The present invention relates to a technique of suppressing deterioration of image quality caused by a foreign substance adhering to the surface of an optical element such as an optical low-pass filter arranged in front of an image sensor such as a CCD or CMOS sensor in an image capturing apparatus.

2. Description of the Related Art

When the lens is detached from the camera body of a lens-interchangeable digital camera, mote floating in air may enter the camera body. The camera incorporates various mechanical units such as a shutter mechanism which mechanically operate. When these mechanical units operate, dust such as metal powder may be generated in the camera body.

When a foreign substance such as dust or mote adheres to the surface of an optical low-pass filter which is an optical element arranged in front of an image sensor and forms the image capturing unit of the digital camera, the shadow of the foreign substance is contained in a captured image, deteriorating the image quality.

A camera using a silver-halide film feeds the film in every shooting. Hence, images never contain the same foreign substance at the same position continuously. However, the digital camera requires no operation of feeding the film frame in every shooting, and therefore, captured images continuously contain the same foreign substance at the same position.

To solve this problem, there is proposed a method of correcting a pixel capturing the shadow of a foreign substance by using the signals of neighboring pixels or the like. As a technique of correcting such a pixel, for example, Japanese Patent Laid-Open No. 6-105241 proposes a pixel defect correction method of correcting the pixel defect of an image sensor. Japanese Patent Laid-Open No. 2004-242158 proposes a method which simplifies setting of position information of a pixel defect. According to this method, the extension of an image file recorded in the dust obtaining mode is changed from that of a normal image. The PC (Personal Computer) automatically discriminates a dust information image, and corrects a target image based on this information.

Recently, there is proposed a technique of handling moving image information as digital data and encoding it at high compression ratio with high image quality to accumulate and transmit it. This technique is becoming popular.

Motion JPEG (Joint Photographic Experts Group) encodes a moving image by applying still image encoding (e.g., JPEG encoding) to each frame. Although JPEG encoding basically targets still images, products which apply JPEG encoding to even moving images by high-speed processing have come into practical use.

An outline of JPEG encoding will be explained briefly. Image data is divided into blocks of a predetermined size (e.g., blocks each having 8×8 pixels), and each block undergoes 2D discrete cosine transform. The transform coefficient is quantized linearly or non-linearly. The quantized transform coefficient undergoes Huffman coding (variable length coding). More specifically, the difference value between the DC component of the transform coefficient and that of a neighboring block is Huffman-coded. The AC component of the transform coefficient is converted from a low-frequency component to a high-frequency serial component by zig-zag scanning. A set of an invalid component "0" run and a subsequent valid component run is Huffman-coded.

To the contrary, H.264 (MPEG4-Part10 AVC) is proposed as an encoding method aiming at higher compression ratios and higher image qualities. It is known that H.264 requires larger calculation amounts for encoding and decoding than those in conventional encoding methods such as MPEG2 and MPEG4, but can achieve higher coding efficiencies (see ISO/IEC 14496-10, "Advanced Video Coding").

FIG. 14 is a diagram showing the arrangement of an image processing apparatus which compresses image data by H.264. In FIG. 14, input image data is divided into macroblocks, which are sent to a subtracter 401. The subtracter 401 calculates the difference between image data and a predicted value, and outputs it to an integer DCT (Discrete Cosine Transform) transform unit 402. The integer DCT transform unit 402 executes integer DCT transform for the input data, and outputs the transformed data to a quantization unit 403. The quantization unit 403 quantizes the input data. The quantized data is sent as difference image data to an entropy encoder 415, while it is inversely quantized by an inverse quantization unit 404, and undergoes inverse integer DCT transform by an inverse integer DCT transform unit 405. An adder 406 adds a predicted value to the inversely transformed data, reconstructing an image.

The reconstructed image is sent to a frame memory 407 for intra (intra-frame) prediction, while it undergoes deblocking filter processing by a deblocking filter 409, and then is sent to a frame memory 410 for inter (inter-frame) prediction. The image in the intra prediction frame memory 407 is used for intra prediction by an intra prediction unit 408. The intra prediction uses the value of a pixel adjacent to an encoded block as a predicted value within a single picture.

The image in the inter prediction frame memory 410 is formed from a plurality of pictures, as will be described later. A plurality of pictures are classified into two lists "List0" and "List1". An inter prediction unit 411 uses a plurality of pictures classified into the two lists for inter prediction. After the inter prediction, a memory controller 413 updates internal images. The inter prediction unit 411 performs inter prediction to determine a predicted image using an optimal motion vector based on the result of motion detection between image data of different frames by a motion detection unit 412.

As a result of the intra prediction and inter prediction, a selector 414 selects an optimal prediction result. The motion vector is sent to the entropy encoder 415, where it is encoded together with the difference image data, forming an output bit stream.

H.264 inter prediction will be explained in detail with reference to FIGS. 15 to 18.

The H.264 inter prediction can use a plurality of pictures for prediction. To specify a reference picture, two lists "List0" and "List1" are prepared. Each list can hold a maximum of five reference pictures.

Only "List0" is used for P-pictures to mainly perform forward prediction. "List0" and "List1" are used for B-pictures to perform bidirectional prediction (or only forward or backward prediction). That is, "List0" holds pictures mainly for forward prediction, and "List1" holds pictures mainly for backward prediction.

FIG. 15 exemplifies a reference list used in encoding. This example assumes that the ratio of I-, P-, and B-pictures is a standard one. That is, I-pictures are arranged at an interval of 15 frames, P-pictures are arranged at an interval of three frames, and B-pictures between I- and P-pictures are arranged at an interval of two frames. In FIG. 15, image data 1001 is obtained by arranging pictures in the display order. Each square in the image data 1001 describes the type of picture and a number representing the display order. For example, a picture I15 is an I-picture whose display order is 15, and is used for only intra prediction. A picture P18 is a P-picture whose display order is 18, and is used for only forward prediction. A picture B16 is a B-picture whose display order is 16, and is used for bidirectional prediction.

The encoding order is different from the display one, and data are encoded in the prediction order. In FIG. 15, data are encoded in the order of "I15, P18, B16, B17, P21, B19, B20, . . . ."

In FIG. 15, a reference list (List0) 1002 holds temporarily encoded/decoded pictures. For example, inter prediction using a picture P21 (P-picture whose display order is 21) refers to pictures which have been encoded and decoded in the reference list (List0) 1002. In the example shown in FIG. 15, the reference list 1002 contains pictures P06, P09, P12, I15, and P18.

In inter prediction, a motion vector having an optimal predicted value is obtained for each macroblock from reference pictures in the reference list (List0) 1002, and encoded. Pictures in the reference list (List0) 1002 are sequentially given reference picture numbers, and discriminated (separately from numbers shown in FIG. 15).

After the end of encoding the picture P21, it is newly decoded and added to the reference list (List0) 1002. The oldest reference picture (in this case, the picture P06) is deleted from the reference list (List0) 1002. Encoding proceeds in the order of pictures B19, B20, and P24. FIG. 16 shows the state of the reference list (List0) 1002 at this time.

FIG. 17 shows a change of the reference list for each picture.

In FIG. 17, pictures are encoded sequentially from the top. FIG. 17 shows a picture during encoding and the contents of the reference lists List0 and List1 for it. When a P-picture (or I-picture) is encoded as shown in FIG. 17, the reference lists List0 and List1 are updated to delete the oldest pictures from the reference lists List0 and List1. In this example, the reference list List1 holds only one picture. This is because a larger number of pictures referred to for backward prediction increases the buffer amount till decoding. In other words, backward pictures excessively distant from a picture during encoding are not referred to.

In this example, I- and P-pictures are referred to, and all I- and P-pictures are sequentially added to the reference lists List0 and List1. Only P-pictures are used in the reference list List1 for backward prediction because this picture arrangement is considered to be the most popular one. However, the picture arrangement in the reference list is merely an example of the most popular one. H.264 itself has a high degree of freedom for the configuration of the reference list.

For example, not all I- and P-pictures need be added to the reference list, and B-pictures can be added to the reference list. Also, H.264 defines a long-term reference list of pictures which stay in the reference list until an explicit instruction is received. FIG. 18 shows a change of the reference list when adding B-pictures to the reference list. When adding B-pictures to the reference list, encoded pictures may be added to the reference list every time all B-pictures are encoded.

FIG. 19 shows partitioning of a macroblock of 16×16 pixels into smaller macroblocks in H.264 inter prediction. The partitioned macroblocks can refer to independent reference pictures to obtain a motion vector. A macroblock of 8×8 pixels can be partitioned into smaller sub-macroblocks. Although the sub-macroblocks refer to a single reference picture, their motion vectors are obtained independently. Note that Japanese Patent Laid-Open No. 2005-5844 also discloses an arrangement capable of changing the motion compensation block size, as shown in FIG. 27 of this reference.

A general playback method for a file recorded by H.264 will be explained.

As described above, the MP4 (MPEG-4) film format is used as a general-purpose format for recording MPEG (MPEG-2 or MPEG-4 format) image data obtained by a digital video camera, digital still camera, or the like. The MP4 file format ensures compatibility with other digital devices to, for example, play back image data recorded as an MP4 file.

As represented by a of FIG. 20, an MP4 file is basically formed from an mdat box which holds encoded stream image data, and a moov box which holds stream image data-related information.

The mdat box is formed from a plurality of chunks (chunk cN), as represented by b of FIG. 20. Each chunk is formed from a plurality of samples (sample sN), as represented by d of FIG. 20. For example, the respective samples sample s1, sample s2, sample s3, sample s4, . . . correspond to encoded MPEG image data $I_0, B_{-2}, B_{-1}, P_3, \ldots$, as represented by e of FIG. 20.

$I_0, I_1, I_2, \ldots, I_n$ represent intra-encoded (intra-frame-encoded) frame image data. $B_0, B_1, B_2, \ldots, B_n$ represent frame image data encoded (inter-frame-encoded) by referring to reference image data bidirectionally. $P_0, P_1, P_2, \ldots, P_n$ represent frame image data encoded (inter-frame-encoded) by referring to reference image data unidirectionally (forward direction). These frame image data are variable-length encoded data.

As represented by c of FIG. 20, the moov box is formed from an mvhd box which holds header information recording the creation date and time, and the like, and a trak box which holds information on stream image data stored in the mdat box.

Information stored in the trak box includes an stco box which stores information of an offset value for each chunk of the mdat box, as represented by h of FIG. 20. An stsc box which stores information of the number of samples in each chunk, as represented by g of FIG. 20, and an stsz box which stores information of the size of each sample, as represented by f of FIG. 20.

The amounts of data stored in the stco, stsc, and stsz boxes increase together with the recorded image data amount, i.e., the recording time. For example, when an image of 30 frames per sec is recorded as an MP4 file by storing every 15 frames in one chunk, the data amount reaches 1 Mbyte for 2 hours, requiring a moov box of a 1-Mbyte capacity.

When playing back this MP4 file, the moov box of the MP4 file is read from the recording medium, the stco, stsc and stsz boxes in the moov box are analyzed. After that, each chunk in the mdat box can be accessed.

When recording an image in the MP4 file format, the stream data increases over time to a very large size. Hence, the stream data needs to be written in the file even during recording.

However, the size of the moov box also increases in accordance with the recording time, as described above. The size of the MP4 header is not defined till the end of recording, so the write offset position of stream data in the file cannot be decided.

For this reason, recording by a general moving image processing apparatus adopts the following measures using the flexibility of the MP4 file format.

(1) The mdat box is arranged at the start of a file, and after the end of recoding, the moov box is arranged next to the mdat box (a of FIG. 21).

(2) As proposed in Japanese Patent Laid-Open No. 2003-289495, the size of the moov box is determined in advance to decide the offset position of the mdat box, and then recoding is done (b of FIG. 21). Even when the recording time is short and the header area does not become full, the area remains as a free box. When recording data over the header size, the data is recorded by properly decimating frame number information of I-pictures, maintaining a predetermined header size.

(3) A pair of moov and mdat boxes is divided into a plurality of pairs to arrange them (c of FIG. 21). In this case, the second and subsequent header areas are called moof boxes.

These are the structures of general MP4 files.

FIG. 22 is a block diagram exemplifying the basic arrangement of a moving image playback apparatus which plays back a moving image compression-encoded by H.264.

Referring to FIG. 22, the moving image playback apparatus includes a recording medium 801, a playback circuit 802 which plays back data from a recording medium, a buffer circuit 803, a variable-length decoding circuit 804, an inverse quantization circuit 805, an inverse DCT circuit 806, an addition circuit 807, a memory 808, a motion compensation circuit 809, a switching circuit 810, a rearrangement circuit 811, an output terminal 812, a header information analysis circuit 813, a playback control circuit 814, and a control signal input terminal 815.

The sequence of playback processing in the moving image playback apparatus shown in FIG. 22 will be explained.

Upon receiving an instruction from the playback control circuit 814, the playback circuit 802 plays back an MP4 file recorded on the recording medium 801, and starts supplying it to the buffer circuit 803. At the same time, the playback control circuit 814 controls the header information analysis circuit to analyze an offset, chunk information, and sample information in the stco box, stsc box, and stsz box representing storage statuses in mdat in the moov box. The playback control circuit 814 controls the playback circuit 802 to start playing back stream image data in the mdat box from the recording medium 801.

The playback circuit 802 plays back, from the start address, the stream image data in the mdat box of the file recorded on the recording medium 801, and supplies it to the buffer circuit 803. Readout of the stream image data stored in the buffer circuit 803 starts in accordance with the occupancy of the buffer circuit 803 and the like. The stream image data is supplied to the variable-length decoding circuit 804. The variable-length decoding circuit 804 executes variable-length decoding for the played-back stream image data supplied from the buffer circuit 803, and supplies the decoded stream image data to the inverse quantization circuit 805.

The inverse quantization circuit 805 inversely quantizes the stream image data supplied from the variable-length decoding circuit 804 upon variable-length decoding. The inverse quantization circuit 805 supplies the inversely quantized stream image data to the inverse DCT circuit 806. The inverse DCT circuit 806 executes inverse DCT for the inversely quantized data supplied from the inverse quantization circuit 805, and supplies the inverse DCT data to the addition circuit 807. The addition circuit 807 adds the inverse DCT data supplied from the inverse DCT circuit 806, and data supplied from the switching circuit 810.

Of stream image data played back from the recording medium 801, intra-frame-encoded data $I_0$ of GOP0 (Group Of Picture) is played back first, as shown in FIG. 23. The playback control circuit 814 controls to select the terminal a of the switching circuit 810. The switching circuit 810 supplies data "0" to the addition circuit 807. The addition circuit 807 adds data "0" supplied from the switching circuit 810, and inverse DCT data supplied from the inverse DCT circuit 806, and supplies the added data as a played-back frame $F_0$ to the memory 808 and rearrangement circuit 811. The memory 808 stores the added data supplied from the addition circuit 807.

Bidirectionally predictive-encoded picture data $B_{-2}$ and $B_{-1}$ are played back next to the intra-frame-encoded data $I_0$ of GOP0. The playback sequence up to the inverse DCT circuit 806 is the same as that described for the intra-frame-encoded data $I_0$, and a description thereof will not be repeated.

The inverse DCT circuit 806 supplies bidirectionally predictive-encoded inverse DCT image data to the addition circuit 807. At this time, the playback control circuit 814 controls the switching circuit 810 so that the movable terminal c of the switching circuit 810 selects the fixed terminal b. The switching circuit 810 supplies data from the motion compensation circuit 809 to the addition circuit 807.

The motion compensation circuit 809 detects a motion vector which has been generated in encoding from played-back stream image data and recorded in the stream image data. The motion compensation circuit 809 reads out data of a reference block (in this case, only data from the played-back intra-frame-encoded data $F_0$ because recording has just started) from the memory 808, and supplies it to the movable terminal c of the switching circuit 810.

The addition circuit 807 adds inverse DCT data supplied from the inverse DCT circuit 806, and motion-compensated data supplied from the switching circuit 810, supplying the added data as played-back frames $F_{-2}$ and $F_{-1}$ to the rearrangement circuit 811.

Then, unidirectionally predictive-encoded picture data $P_3$ is played back. The playback sequence up to the inverse DCT circuit 806 is the same as that described for the intra-frame-encoded data $I_0$, and a description thereof will not be repeated.

The inverse DCT circuit 806 supplies inverse DCT picture data to the addition circuit 807. At this time, the playback control circuit 814 controls the switching circuit 810 so that the movable terminal c of the switching circuit 810 selects the fixed terminal b. The switching circuit 810 supplies data from the motion compensation circuit 809 to the addition circuit 807.

The motion compensation circuit 809 detects a motion vector which has been generated in encoding from played-back stream image data and recorded in the stream image data. The motion compensation circuit 809 reads out data of a reference block (in this case, data from the played-back intra-frame-encoded data $F_0$) from the memory 808, and supplies it to the movable terminal c of the switching circuit 810.

The addition circuit 807 adds inverse DCT data supplied from the inverse DCT circuit 806, and motion-compensated data supplied from the switching circuit 810, supplying the added data as a played-back frame $F_3$ to the memory 808 and rearrangement circuit 811. The memory 808 stores the added data supplied from the addition circuit 807.

Then, pictures $B_1$ and $B_2$ are played back. These pictures are not frames at the start of recoding, and thus are played back by the same sequence as that described for the pictures $B_{-2}$ and $B_{-1}$ except that they are played back from the frames $F_0$ and $F_3$ by bidirectional prediction. In the above-described way, $P_6, B_4, B_5, \ldots$ are played back sequentially.

The rearrangement circuit 811 rearranges the sequentially played-back frames $F_0, F_{-2}, F_{-1}, F_3, F_1, F_2, F_6, F_4, F_5, \ldots$ into $F_{-2}, F_{-1}, F_0, F_1, F_2, F_3, F_4, F_5, F_6, \ldots$, and outputs the rearranged frames to the output terminal 812.

At the start of playing back the file, the header information analysis circuit 813 analyzes an offset, chunk information, and sample information from the stco box, stsc box, and stsz box representing storage statuses in mdat in the moov box of the MP4 file. The playback control circuit 814 operates to skip data till GOP1, and start playing back data from GOP1.

Compact digital cameras capable of recording and playing back a moving image based on these encoding methods have also been developed and commercialized. Users can easily view images with such a digital camera, a personal computer, a DVD player, and the like.

In this situation, a need has recently arisen for recording higher-resolution moving images with a larger number of pixels by lens-interchangeable digital cameras as well as compact digital cameras. However, the lens-interchangeable digital camera suffers dust adhered to the surface of an optical element arranged in front of an image sensor owing to a variety of factors, as described above. If the lens-interchangeable digital camera records a moving image while dust adheres to the surface, the shadow of dust may always appear at the same position in a played-back moving image.

According to a conventional dust removal method for the lens-interchangeable digital camera, information (e.g., information on the position and size of dust) necessary for dust removal and image data are recorded. The image is loaded later into a personal computer or the like to remove the shadow of dust by image processing. That is, the recorded image data contains the shadow of dust. As for a still image, dust removal is executed for each still image. As for a moving image, dust removal must be done for all the recording time, which is time-consuming.

In playback, dust correction processing is done using information necessary for dust removal. Even if dust removal processing takes a long time, playback of a still image can wait till the completion of the dust correction processing. In contrast, a moving image expresses the motion of an image by successively playing back a plurality of still images of 15 or 30 frames per sec. Thus, no natural moving image can be played back unless frames can be successively decoded within a predetermined time.

SUMMARY OF THE INVENTION

The present invention allows a user to play back a high-quality moving image in which the shadow of dust or the like is corrected, while increasing the operation speed in playback during dust correction processing.

The present invention in its first aspect provides an image processing apparatus which corrects, based on foreign substance information containing information on a position and size of a foreign substance adhered to an optical element arranged in front of an image sensor in an image capturing apparatus which has captured moving image data constituted by frames, a shadow of the foreign substance in the moving image data generated by performing predictive encoding by referring to image data of a different input frame, the image processing apparatus comprising: a moving image decompression unit configured to decompress an image of each frame by obtaining difference information representing a difference between frames from the moving image data; and a correction unit configured to correct the obtained difference information in the case that the difference information obtained for a region containing the shadow of the foreign substance represented by the foreign substance information is determined to be larger than a predetermined threshold.

The present invention in its second aspect provides a method of controlling an image processing apparatus for correcting, based on foreign substance information containing information on a position and size of a foreign substance adhered to an optical element arranged in front of an image sensor in an image capturing apparatus which has captured moving image data constituted by frames, a shadow of the foreign substance in the moving image data generated by performing predictive encoding, the method comprising: a moving image decompression step of decompressing an image of each frame by obtaining difference information representing a difference between frames from the moving image data; and a correction step of correcting the obtained difference information in the case that the difference information obtained for a region containing the shadow of the foreign substance represented by the foreign substance information is determined to be larger than a predetermined threshold.

Further features of the present invention will become apparent from the following description of exemplary embodiments with reference to the attached drawings.

BRIEF DESCRIPTION OF THE DRAWINGS

FIG. 5 is a view showing the structure of a dust information profile;

FIGS. 11A to 11F are views for explaining a moving image in decompression in the embodiment of the present invention;

FIG. 15 is a view exemplifying a reference list when encoding a picture P21;

FIG. 16 is a view exemplifying a reference list when encoding a picture P24;

FIG. 17 is a view showing a change of the reference list for each picture;

FIG. 18 is a view showing a change of the reference list when adding B-pictures to the reference list;

DESCRIPTION OF THE EMBODIMENTS

An embodiment of the present invention will now be described in detail with reference to the accompanying drawings.

Figure 1:
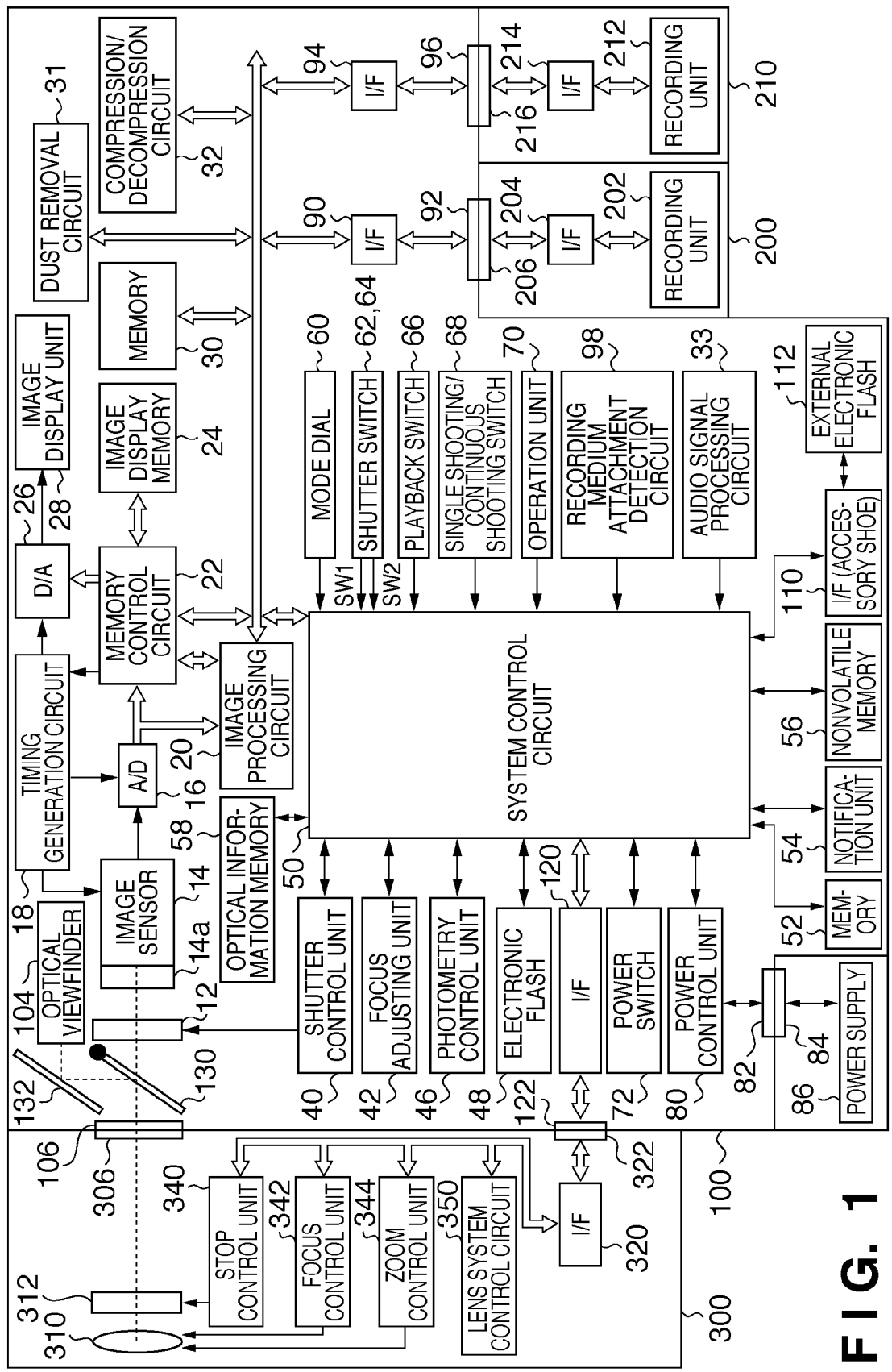
FIG. 1 is a block diagram showing the arrangement of an image capturing apparatus having an image processing function in an embodiment of the present invention.

FIG. 1 is a block diagram showing the arrangement of an image capturing apparatus having an image processing function in the embodiment of the present invention. The embodiment will exemplify a lens-interchangeable single-lens reflex digital still camera as the image capturing apparatus. The present invention is also applicable to, e.g., a lens-interchangeable digital video camera as the image capturing apparatus.

As shown in FIG. 1, the image capturing apparatus according to the embodiment mainly includes a camera body 100 and an interchangeable-lens type lens unit 300.

The lens unit 300 includes an imaging lens 310 formed from a plurality of lenses, a stop 312, and a lens mount 306 which mechanically connects the lens unit 300 to the camera body 100. The lens mount 306 incorporates various functions for electrically connecting the lens unit 300 to the camera body 100. In the lens mount 306, an interface 320 connects the lens unit 300 to the camera body 100. A connector 322 electrically connects the lens unit 300 to the camera body 100.

The connector 322 also has a function of exchanging control signals, status signals, and data signals between the camera body 100 and the lens unit 300 and also receiving currents of various voltages. The connector 322 may communicate not only by telecommunication but also by optical communication or speech communication.

A stop control unit 340 controls the stop 312 in cooperation with a shutter control unit 40 (to be described later) which controls a shutter 12 of the camera body 100 on the basis of photometry information from a photometry control unit 46. A focus control unit 342 controls focusing of the imaging lens 310. A zoom control unit 344 controls zooming of the imaging lens 310.

A lens system control circuit 350 controls the overall lens unit 300. The lens system control circuit 350 has a memory for storing constants, variables, and programs for operations. The lens system control circuit 350 also has a nonvolatile memory for holding identification information such as a number unique to the lens unit 300, management information, functional information such as open and minimum aperture values and a focal length, and current and past set values.

The arrangement of the camera body 100 will be described next.

A lens mount 106 mechanically connects the camera body 100 to the lens unit 300. Mirrors 130 and 132 guide a light beam which has entered the imaging lens 310 to an optical viewfinder 104 by the single-lens reflex method. The mirror 130 can be either a quick return mirror or a half mirror. Reference numeral 12 denotes a focal plane shutter. An image sensor 14 is formed from a CCD sensor, CMOS sensor, or the like, and photoelectrically converts an object image. An optical element 14a such as an optical low-pass filter is arranged in front of the image sensor 14. An image generated by the image sensor 14 contains the shadow of a foreign substance such as dust adhering to the surface of the optical element 14a, deteriorating the image quality. The embodiment is directed to a technique of suppressing the deterioration of image quality.

The light beam which has entered the imaging lens 310 is guided via the stop 312 serving as a light quantity restriction means, the lens mounts 306 and 106, the mirror 130, and the shutter 12 by the single-lens reflex method, and forms an optical image on the image sensor 14.

An A/D converter 16 converts an analog signal (output signal) output from the image sensor 14 into a digital signal. A timing generation circuit 18 supplies clock signals and control signals to the image sensor 14, the A/D converter 16, and a D/A converter 26. The timing generation circuit 18 is controlled by a memory control circuit 22 and system control circuit 50.

An image processing circuit 20 executes predetermined pixel interpolation processing and color conversion processing for data from the A/D converter 16 or data from the memory control circuit 22. If necessary, the image processing circuit 20 also performs predetermined arithmetic processing using image data output from the A/D converter 16. Based on the obtained arithmetic result, the system control circuit 50 can execute auto-focus (AF) processing, auto-exposure (AE) processing, and pre-electronic flash (EF) processing of TTL (Through The Lens) scheme to control the shutter control unit 40 and a focus adjusting unit 42. The image processing circuit 20 also executes predetermined arithmetic processing using image data output from the A/D converter 16 and also performs automatic white balance (AWB) processing of TTL scheme based on the obtained arithmetic result.

In the example shown in FIG. 1 in the embodiment, the focus adjusting unit 42 and photometry control unit 46 are provided for exclusive use. AF processing, AE processing, and EF processing may be performed using not the image processing circuit 20 but the focus adjusting unit 42 and photometry control unit 46. Alternatively, AF processing, AE processing, and EF processing may be done first using the focus adjusting unit 42 and photometry control unit 46 and then using the image processing circuit 20.

The memory control circuit 22 controls the A/D converter 16, the timing generation circuit 18, the image processing circuit 20, an image display memory 24, the D/A converter 26, a memory 30, and a compression/decompression circuit 32. Image data output from the A/D converter 16 is written in the image display memory 24 or memory 30 via the image processing circuit 20 and memory control circuit 22 or via only the memory control circuit 22.

Display image data written in the image display memory 24 is displayed on an image display unit 28 such as an LCD of TTL scheme via the D/A converter 26. The image display unit 28 sequentially displays captured image data, thereby implementing an electronic viewfinder (EVF) function. The image display unit 28 can arbitrarily turn on/off its display in accordance with an instruction from the system control circuit 50. When display is OFF, the power consumption of the camera body 100 can greatly be reduced.

The memory 30 is used to store captured still images or moving images and has a memory capacity enough to store a predetermined number of still images or a predetermined amount of moving image. Even in continuous shooting or panoramic shooting to continuously capture a plurality of still images, many images can be written in the memory 30 at high speed. When a moving image is captured, the memory 30 is used as a frame buffer to successively write images at a predetermined rate. The memory 30 is also usable as the work area of the system control circuit 50.

A dust removal circuit 31 removes the shadow of dust contained in image data by image processing using dust information stored in a nonvolatile memory 56 (to be described later) and optical information obtained from the lens unit 300.

The compression/decompression circuit 32 compresses/decompresses image data using a known compression method. The compression/decompression circuit 32 reads out an image from the memory 30, compresses or decompresses it, and writes the processed data in the memory 30 again. The compression/decompression circuit 32 also has a moving image compression/decompression function of compression-encoding moving image data into a predetermined format, or decompressing predetermined compression-encoded data into a moving image signal.

An audio signal processing circuit 33 has a function of encoding an audio signal input from a microphone (not shown) into a predetermined encoding format, and decoding predetermined encoded data into an audio signal. The digital camera in the embodiment has a function of outputting audio data decoded by the audio signal processing circuit 33 from a loudspeaker (not shown).

The shutter control unit 40 controls the shutter 12 in cooperation with the stop control unit 340 that controls the stop 312 based on photometry information from the photometry control unit 46. The focus adjusting unit 42 executes AF (Auto Focus) processing. A light beam which has entered the imaging lens 310 of the lens unit 300 is guided via the stop 312, the lens mounts 306 and 106, the mirror 130, and a focus adjusting sub-mirror (not shown) by the single-lens reflex method, detecting the focus state of an image formed as an optical image.

The photometry control unit 46 executes AE (Auto Exposure) processing. A light beam which has entered the imaging lens 310 of the lens unit 300 is guided via the stop 312, the lens mounts 306 and 106, the mirror 130, and a photometry sub-mirror (not shown) by the single-lens reflex method, measuring the exposure state of an image formed as an optical image. An electronic flash 48 has an AF auxiliary light projecting function and an electronic flash control function. The photometry control unit 46 also has an EF (Electronic Flash control) processing function in cooperation with the electronic flash 48.

AF control may also be done based on the measurement result of the focus adjusting unit 42 and an arithmetic result obtained by arithmetically processing image data from the A/D converter 16 by the image processing circuit 20. Exposure control may also be performed based on the measurement result of the photometry control unit 46 and an arithmetic result obtained by arithmetically processing image data from the A/D converter 16 by the image processing circuit 20.

The system control circuit 50 controls the overall camera body 100 and incorporates a known CPU. A memory 52 stores constants, variables, and programs for the operation of the system control circuit 50.

A notification unit 54 notifies the outside of operation states and messages using a text, image, and sound in accordance with program execution by the system control circuit 50. Examples of the notification unit 54 are a display unit such as an LCD or LED for visual display and a sound generation element for generating a notification by sound. The notification unit 54 includes one of them or a combination of two or more of them. Especially, the display unit is arranged at one or a plurality of visible positions near an operation unit 70 of the camera body 100. The optical viewfinder 104 incorporates some functions of the notification unit 54.

The display contents of the image display unit 28 such as an LCD among those of the notification unit 54 include display associated with shooting modes (e.g., single shooting/continuous shooting and self timer), display associated with recording (e.g., compression ratio, number of recording pixels, number of recorded images, and number of recordable images), and display associated with shooting conditions (e.g., shutter speed, aperture value, exposure compensation, brightness compensation, external flash light emission amount, and red eye mitigation). The image display unit 28 also displays macro shooting, buzzer setting, battery level, error message, information by a plurality of digits, and the attached/detached states of a recording medium 200 and PC 210. The image display unit 28 also displays the attached/detached state of the lens unit 300, communication I/F operation, date and time, and the connection state of an external computer.

Some display contents of the notification unit 54 are indicated in the optical viewfinder 104, which include, e.g., in-focus, ready for shooting, camera shake warning, flash charge, flash charge completion, shutter speed, aperture value, exposure compensation, and recording medium write operation.

The nonvolatile memory 56 is an electrically erasable/programmable memory such as an EEPROM and stores programs (to be described later) and the like.

An optical information memory 58 stores various kinds of lens information (to be described later) obtained from the lens unit 300 via a connector 122.

Reference numerals 60, 62, 64, 66, 68, and 70 denote operation means for inputting various kinds of operation instructions of the system control circuit 50. They include a single component or a combination of a plurality of switches, dials, touch panel, pointing by line-of-sight detection, and voice recognition device.

The operation means will be described here in detail.

The mode dial switch 60 can selectively set a shooting mode such as an automatic shooting mode, programmed shooting mode, shutter speed priority shooting mode, stop priority shooting mode, manual shooting mode, or focal depth priority (depth) shooting mode. The mode dial switch 60 can also selectively set a shooting mode such as a portrait shooting mode, landscape shooting mode, closeup shooting mode, sports shooting mode, nightscape shooting mode, and panoramic shooting mode.

The shutter switch SW1 62 is turned on by operating a shutter button (not shown) halfway (e.g., half stroke) to designate the start of an operation such as AF processing, AE processing, AWB processing, or EF processing.

The shutter switch SW2 64 is turned on by operating the shutter button (not shown) completely (e.g., full stroke) to designate the start of a series of shooting processes including exposure, development, and recording. In the exposure processing, a signal read out from the image sensor 14 is written in the memory 30 via the A/D converter 16 and memory control circuit 22. Then, the development processing is done based on calculation by the image processing circuit 20 or memory control circuit 22. In the recording processing, image data is read out from the memory 30, compressed by the compression/decompression circuit 32, and written in or transmitted to the recording medium 200 or PC 210.

The playback switch 66 designates the start of a playback operation to read out an image captured in a shooting mode from the memory 30, recording medium 200, or PC 210 and display it on the image display unit 28. The playback switch 66 can set another functional mode such as a playback mode, multiwindow playback/erase mode, or PC-connected mode.

The single shooting/continuous shooting switch 68 can set a single shooting mode in which when the user presses the shutter switch SW2 64, the camera shoots one frame and then stands by, or a continuous shooting mode in which the camera keeps shooting while the user presses the shutter switch SW2 64.

The operation unit 70 includes various buttons and a touch panel. For example, the operation unit 70 includes a live view start/stop button, moving image recording start/stop button, menu button, set button, multiwindow playback/page feed button, flash setting button, single shooting/continuous shooting/self timer switch button, menu move plus (+) button, and menu move minus (−) button. The operation unit 70 further includes a playback image move plus (+) button, playback image move minus (−) button, shooting image quality select button, exposure compensation button, brightness compensation button, external flash light emission amount setting button, and date/time setting button. The numerical values or functions of the plus and minus buttons can be selected more easily using a rotary dial switch.

Also, the operation unit 70 includes an image display ON/OFF switch for turning on/off the image display unit 28, and a quick review ON/OFF switch for setting a quick review function of automatically playing back image data obtained immediately after shooting. The operation unit 70 includes a compression mode switch for selecting a compression ratio for JPEG compression, or a RAW mode to directly digitize a signal from the image sensor and record it on a recording medium. The operation unit 70 includes an AF mode setting switch capable of setting a one-shot AF mode or a servo AF mode. In the one-shot AF mode, the auto-focus operation starts when the user presses the shutter switch SW1 62. Once an in-focus state is obtained, this state is continuously held. In the servo AF mode, the auto-focus operation continues while the user presses the shutter switch SW1 62. The operation unit 70 includes a setting switch capable of setting a dust information obtaining mode to capture a dust detection image and obtain dust information, as will be described later.

A power switch 72 can selectively set the power ON or power OFF mode of the camera body 100. The power switch 72 can also selectively set the power ON or power OFF mode of each of various accessories including the lens unit 300, an external electronic flash 112, the recording medium 200, and the PC 210 connected to the camera body 100.

A power supply control unit 80 includes a cell detection circuit, DC/DC converter, and switching circuit for switching the block to be energized. The power supply control unit 80 detects the attachment/detachment of a cell, the type of cell, and the battery level, controls the DC/DC converter based on the detection result and an instruction from the system control circuit 50, and supplies a necessary voltage to the units including a recording medium for a necessary period.

Reference numerals 82 and 84 denote connectors; and 86, a power supply unit formed from a primary cell (e.g., alkaline cell or lithium cell), a secondary cell (e.g., NiCd cell, NiMH cell, Li-ion cell, or Li-polymer cell), or an AC adapter.

Reference numerals 90 and 94 denote interfaces with a PC or a recording medium (e.g., memory card or hard disk); and 92 and 96, connectors to connect a PC or a recording medium (e.g., memory card or hard disk). A recording medium attachment detection circuit 98 detects whether the recording medium 200 or PC 210 is attached or connected to the connectors 92 and/or 96.

In the embodiment, there are two systems of interfaces and connectors to connect a recording medium. The interfaces and connectors to connect a recording medium can have either one or a plurality of systems. Interfaces and connectors of different standards may also be combined.

Interfaces and connectors compliant with various storage medium standards are usable. Examples are a PCMCIA (Personal Computer Memory Card International Association) card, CF (CompactFlash®) card, and SD card. When the interfaces 90 and 94 and the connectors 92 and 96 comply with the standard of the PCMCIA card or CF® card, they allow connecting various kinds of communication cards. Examples of the communication cards are a LAN card, modem card, USB (Universal Serial Bus) card, and IEEE (Institute of Electrical and Electronic Engineers) 1394 card. A P1284 card, SCSI (Small Computer System Interface) card, and PHS are also available. Image data and management information associated with it can be transferred to another computer or a peripheral device such as a printer by connecting these kinds of communication cards.

The optical viewfinder 104 can display an optical image formed by a light beam which enters the imaging lens 310 and is guided via the stop 312, lens mounts 306 and 106, and mirrors 130 and 132 by the single-lens reflex method. It is therefore possible to perform shooting using not the electronic viewfinder function of the image display unit 28 but only the optical viewfinder. Some functions of the notification unit 54 such as an in-focus state, camera shake warning, flash charge, shutter speed, aperture value, and exposure compensation are displayed in the optical viewfinder 104.

The external electronic flash 112 is attached via an accessory shoe 110.

An interface 120 connects the camera body 100 to the lens unit 300 in the lens mount 106.

The connector 122 electrically connects the camera body 100 to the lens unit 300. A lens attachment detection unit (not shown) detects whether the lens unit 300 is attached to the lens mount 106 and connector 122. The connector 122 also has a function of exchanging control signals, status signals, data signals, and the like between the camera body 100 and the lens unit 300 and also supplying currents of various voltages.

Various kinds of optical information (e.g., aperture value, zoom position, pupil distance, and focal length) of the lens unit 300 that are communicated via the connector 122 are stored in the optical information memory 58 of the camera body 100. The communication of the information is sometimes requested by the camera, or the information is communicated from the lens every time it is updated.

The connector 122 may communicate not only by telecommunication but also by optical communication or speech communication.

The recording medium 200 is a memory card or hard disk. The recording medium 200 includes a recording unit 202 formed from a semiconductor memory or magnetic disk, an interface 204 with the camera body 100, and a connector 206 to connect the camera body 100.

As the recording medium 200, a memory card (e.g., PCMCIA card or CompactFlash®), or a hard disk is usable. A micro DAT, a magnetooptical disk, an optical disk (e.g., CD-R or CD-RW), or a phase-change optical disk (e.g., a DVD) may also be used.

The PC 210 includes a recording unit 212 formed from a magnetic disk (HD), an interface 214 with the camera body 100, and a connector 216 to connect the camera body 100. The interface 214 can be a USB, IEEE1394, or the like, but is not particularly limited.

Processing of eliminating, by image processing, the influence of dust on the optical member 14a such as a low-pass filter or cover glass arranged in front of the image sensor of the image capturing apparatus having the above-described arrangement will be described next.

In the embodiment, a dust detection image is captured to obtain dust information (foreign substance information) representing the adhesion position, size, and the like of dust (foreign substance). Dust data is extracted to generate dust data. The dust detection image is preferably obtained by capturing a surface having a uniform luminance as much as possible. However, the uniformity need not be strict because it is desirable to easily capture the image in a familiar place. For example, the embodiment assumes capturing a blue sky or white wall.

Figure 2:
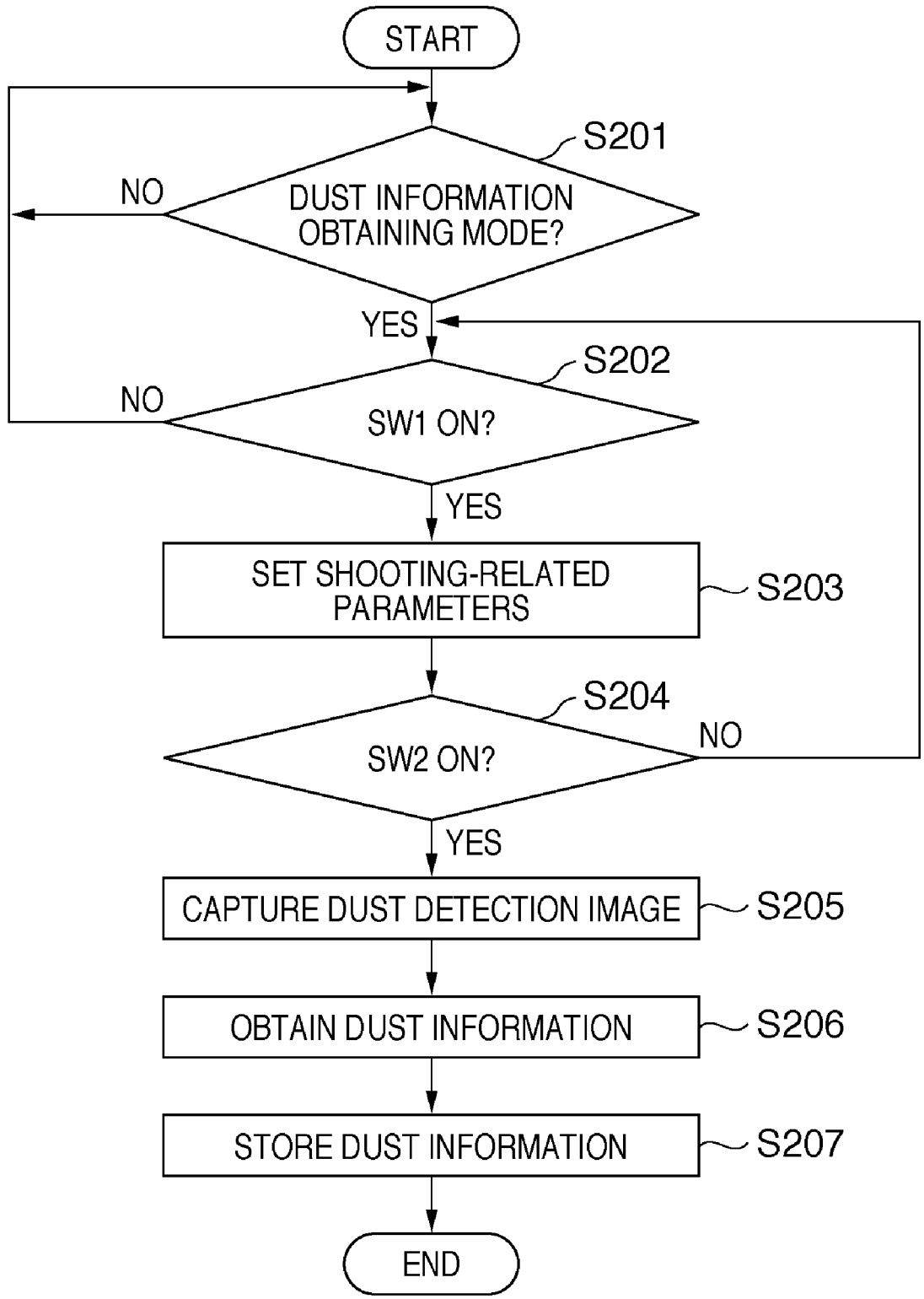
FIG. 2 is a flowchart showing processing in the image capturing apparatus when obtaining dust information in the embodiment of the present invention.

FIG. 2 is a flowchart showing processing of the image capturing apparatus (digital camera in the embodiment) when obtaining dust information in the embodiment.

First, in step S201, it is determined whether the operation unit 70 selects a dust information obtaining mode. The determination in step S201 is repeated until the dust information obtaining mode is selected. If the dust information obtaining mode is selected, the process advances to step S202 to determine whether the user has turned on the shutter switch SW1 62. If the shutter switch SW1 62 is OFF, the process returns to step S201 to repeat the processing.

Figures 3, 4:
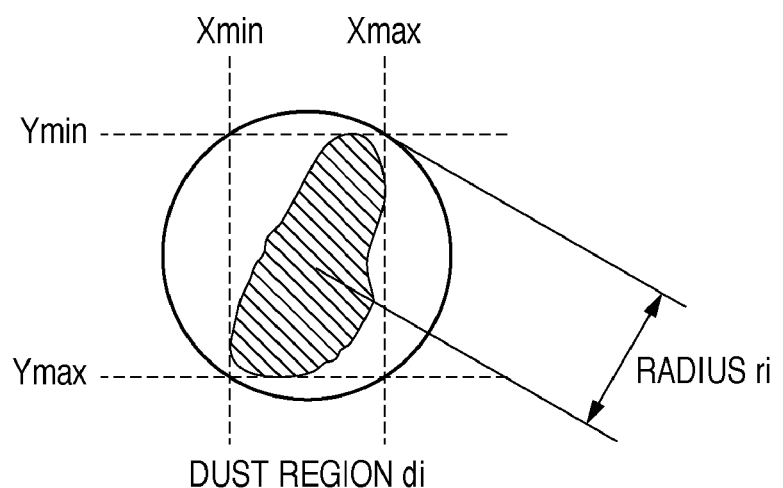
FIG. 3 is a table showing a list of setting parameters when obtaining dust information in the embodiment of the present invention.
FIG. 4 is a view showing an outline of dust region size calculation.

If the user has turned on the shutter switch SW1 62, the aperture value, ISO value, shutter speed, and other shooting-related parameters are set in step S203. FIG. 3 shows the parameters set here. The aperture value is set to, e.g., F22 to stop down the aperture. Shooting may be done using the minimum aperture within a range settable in the lens unit 300 connected to the lens mount 106. The aperture is stopped down because dust normally adheres not to the surface of the image sensor 14 but to the surface of the optical element 14a such as a protective glass protecting the image sensor 14 or an optical filter placed not on the image sensor side but on the object side, and the imaging state changes depending on the aperture value of the lens unit 300. At almost the full-aperture value, the dust image blurs, failing to obtain an appropriate dust detection image. It is therefore preferable to shoot at the minimum aperture.

Referring back to the flowchart in FIG. 2, at this time, the user points the image capturing apparatus to a uniform luminance surface such as a wall as white as possible and operates the shutter switch SW2 64.

In step S204, it is determined whether the user has turned on the shutter switch SW2 64. If the shutter switch SW2 64 is OFF, the process returns to step S202 to determine whether the shutter switch SW1 62 is ON or OFF. If the user has turned on the shutter switch SW2 64, the process advances to step S205. In step S205, the dust detection image (uniform luminance surface) is captured to store the image data in the memory 30. In step S206, dust information is obtained from the image data stored in the memory 30.

The obtainment of dust information will be described. More specifically, the position (coordinates) and size of a dust region are obtained from the captured dust detection image. First, the region of the captured dust detection image is divided into a plurality of blocks. A maximum luminance Lmax and average luminance Lave in each block are calculated. A threshold value T1 in each block is calculated by $$T1 = Lave \times 0.6 + Lmax \times 0.4$$

A dust-adhered pixel is lower in luminance than neighboring pixels. Thus, a pixel less than the threshold value T1 is determined as a dust pixel. Each isolated region formed from dust pixels is defined as a dust region di (i=0, . . . , n).

FIG. 4 is a view showing an outline of dust region size calculation. As shown in FIG. 4, a maximum value Xmax and minimum value Xmin of the horizontal coordinates and a maximum value Ymax and minimum value Ymin of the vertical coordinates of pixels included in a dust region are obtained. A radius ri representing the size of the dust region di is calculated by $$ri = [\sqrt{\{(Xmax-Xmin)^2 + (Ymax-Ymin)^2\}}]/2$$

Central coordinates (Xdi,Ydi) are obtained approximately by $$Xdi = (Xmax + Xmin)/2$$

$$Ydi = (Ymax + Ymin)/2$$

The obtained position (coordinates) and radius are recorded as a dust information profile.

The size of dust correction data (dust information profile) is sometimes limited by the size of the nonvolatile memory 56 or the like. To cope with this case, pieces of dust position information are sorted by the size and the average luminance value of the dust region. In the embodiment, pieces of dust position information are sorted in the descending order of ri. When ri is the same, pieces of dust position information are sorted in the ascending order of the average luminance value. With this setting, a conspicuous dust image can be preferentially registered in dust correction data. Note that Di represents a sorted dust region, and Ri represents the radius of the dust region Di.

When there is a dust region larger than a predetermined size, it may be excluded from sorting targets and added to the end of a sorted dust region list. This is because if a large dust region undergoes subsequent interpolation processing, it may deteriorate the image quality, and is desirably processed last.

The dust information profile takes a structure shown in FIG. 5. As shown in FIG. 5, the dust information profile stores the lens information and the information of the position and size of dust upon capturing a dust detection image. More specifically, the actual aperture value (F-number) and the lens pupil position upon capturing a dust detection image are stored as the lens information upon capturing the dust detection image. Next, the number (integer value) of detected dust regions is stored in the storage area. Next to this value, the specific parameters of each dust region are stored repeatedly as many as the dust regions. The parameters of a dust region include a set of three numerical values: the radius of dust (e.g., 2 bytes), the x-coordinate of the center of an effective image area (e.g., 2 bytes), and the y-coordinate of the center (e.g., 2 bytes).

The obtained dust information is stored in the nonvolatile memory 56 in step S207, and the processing to obtain dust information ends.

The purpose of a shooting operation in the dust information obtaining mode is to obtain dust information. Thus, in the embodiment, a captured image itself is neither compressed nor recorded on the recording medium 200 so as not to waste the capacity of the recording medium 200 by image data unnecessary for the user. However, an image captured in the dust information obtaining mode may also be compressed and saved in the recording medium 200, similar to a normal image. At this time, the data can be arbitrarily modified by, for example, changing the extension.

The embodiment is directed to a method of performing image processing to correct deterioration of image quality caused by dust when playing back a moving image. Prior to a description of processing for a moving image, processing for a still image will be explained.

When a still image is obtained not by dust detection image shooting but by normal shooting, dust correction data (to be also referred to as foreign substance information, dust information, or dust information profile) shown in FIG. 5 is recorded on the recording medium 200 in association with the image data together with camera set values and the like in normal shooting.

More specifically, dust correction data can be associated with image data by adding the dust correction data to, e.g., an Exif region which is the header field of an image file where camera set values and the like upon shooting are recorded. Alternatively, the dust correction data is recorded as an independent file, and only link information to the dust correction data file is recorded in image data, thereby associating the dust correction data and image data. However, if the image file and the dust correction data file are separately recorded, the link relationship may be lost upon moving the image file. To prevent this, the dust correction data is preferably held together with the image data.

In a moving image file such as an MP4 file described above, a dust information profile is stored in an mvhd box holding header information in a moov box, or an mvhd box in a moof box.

Recording dust correction data in association with image data assumes a case in which image data recorded together with dust correction data is moved to an external image processing apparatus and the external image processing apparatus executes dust removal processing.

Dust removal processing upon normal shooting based on dust information stored in the nonvolatile memory 56 in the above-described way will be explained next with reference to the flowcharts of FIGS. 6 and 7. The following description concerns dust removal processing for a still image. However, the same dust removal processing as that for a still image can be similarly applied to a moving image by executing the processing for an image of every frame. The dust removal circuit 31 in FIG. 1 executes the dust removal processing.

Figure 6:
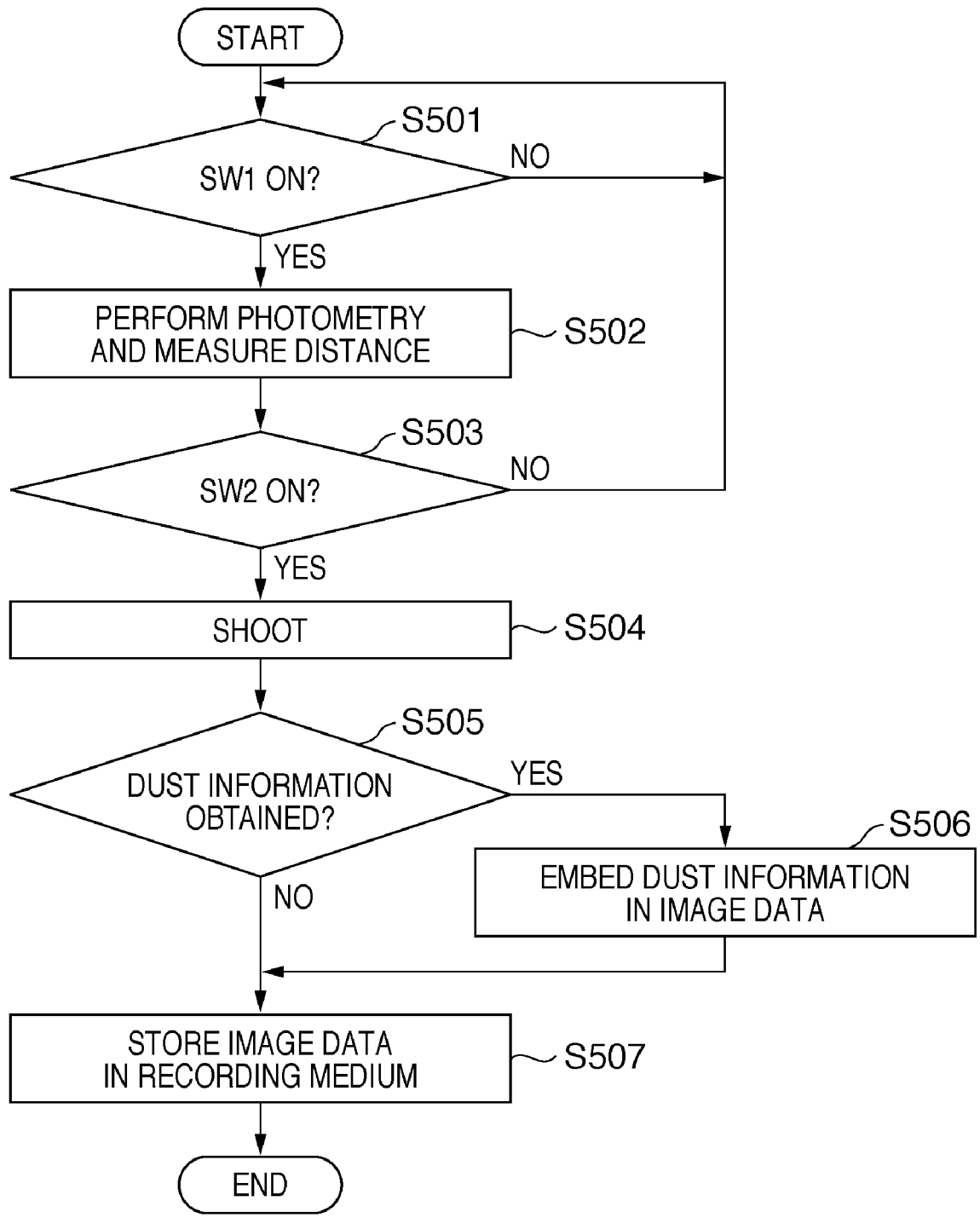
FIG. 6 is a flowchart showing still image capturing processing in normal shooting in the embodiment of the present invention.
Figure 7:
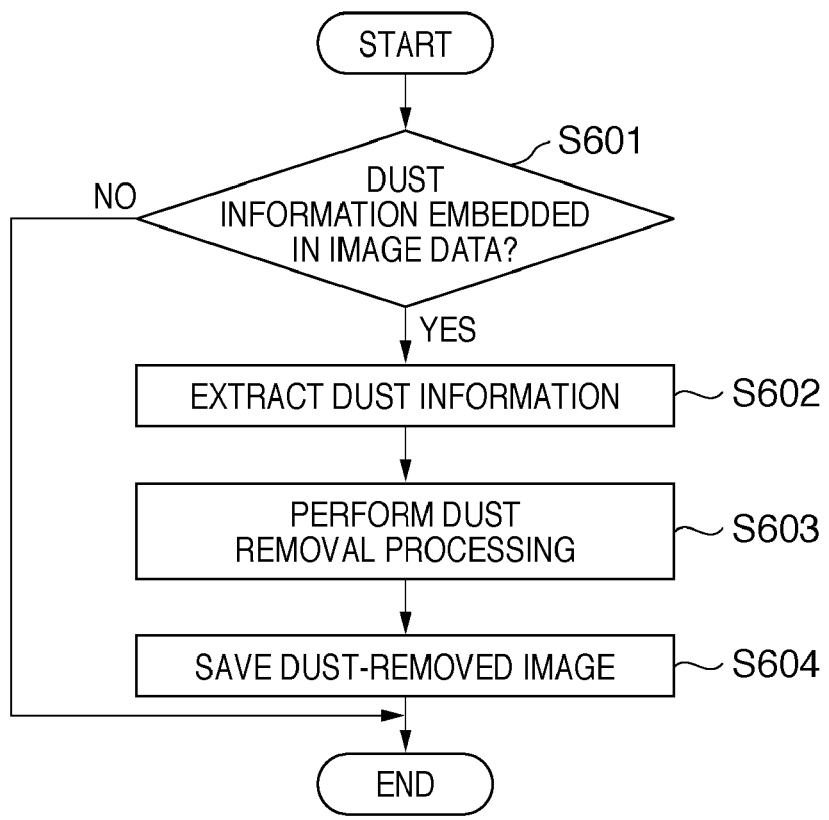
FIG. 7 is a flowchart showing the operation of dust removal processing.

FIG. 6 shows still image capturing processing in normal shooting in the embodiment.

In step S501, the process waits until the user turns on the shutter switch SW1 62. When the user turns on the shutter switch SW1 62, the process advances to step S502 to perform photometry processing and focus adjustment processing. In step S503, it is determined whether the user has turned on the shutter switch SW2 64. If the shutter switch SW2 64 is OFF, the process returns to step S501 to repeat the processing. If it is detected that the user has turned on the shutter switch SW2 64, the process advances to step S504 to perform shooting. After the end of shooting, the process advances to step S505 to determine whether valid dust information exists in the nonvolatile memory 56. If dust information exists, the process advances to step S506. If no dust information exists, the process advances to step S507 to record the captured image data on the recording medium 200.

In the embodiment, it is determined whether dust information exists in the nonvolatile memory 56. However, the necessary condition is whether shooting is done in the dust information obtaining mode, so the determination method is not particularly limited. It is also possible to, for example, set a flag in shooting in the dust information obtaining mode and evaluate it.

In step S506, the obtained dust information is embedded in the header field (e.g., Exif region) of the captured image data. In step S507, the dust information-embedded image data is recorded on the recording medium 200.

The operation of dust removal processing will be explained with reference to FIG. 7.

In step S601, it is determined whether dust information is embedded in a selected image. If dust information is embedded in a selected image, the process advances to step S602 to extract the dust information. In step S603, correction processing such as pixel interpolation processing based on pixels around dust is executed in accordance with the extracted dust information so as to eliminate the influence of the dust from the image data.

A coordinate sequence Di (i=1, 2, ..., n), a radius sequence Ri (i=1, 2, ..., n), an aperture value f1, and a lens pupil position L1 are obtained from the extracted dust correction data. Ri represents the size of dust at the coordinates Di obtained upon sorting dust correction data. f1 represents the aperture value of the lens upon capturing a dust detection image, and L1 represents the pupil position of the lens similarly upon capturing a dust detection image. An aperture value f2 and lens pupil position L2 upon normally capturing an image are acquired, and Di is converted by the following equation. Converted coordinates Di' and a converted radius Ri' are defined by $$Di'(x,y)=(L2\times(L1-H)\times d/((L2-H)\times L1))\times Di(x,y)$$

$$Ri'=(Ri\times f1/f2+3) \quad (1)$$

where d is the distance from the image center to the coordinates Di, and H is the distance from the surface of the image sensor 14 to dust.

The unit is a pixel, and "+3" of Ri' means a margin.

Dust in a region defined by the coordinates Di' and radius Ri' is detected, and if necessary, interpolation processing is applied. Details of interpolation processing will be described later. Dust removal processing is applied to all coordinates, and if all coordinates have been processed, the process advances to step S604.

In step S604, an image having undergone correction processing to eliminate the influence of dust from the captured image is newly recorded.

Then, the dust removal processing ends.

(Interpolation Processing)

Details of dust region interpolation processing will be explained.

Figure 8:
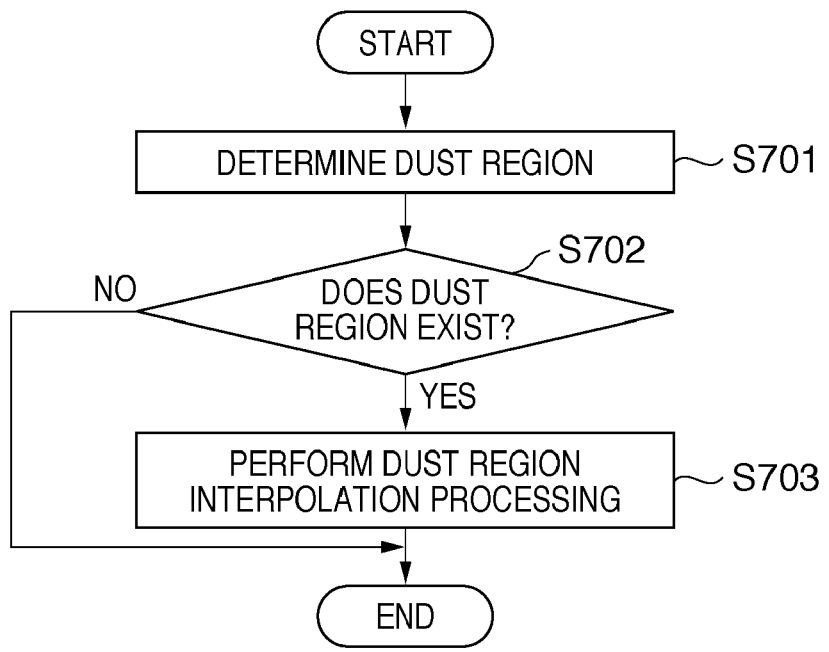
FIG. 8 is a flowchart showing the sequence of an interpolation routine.

FIG. 8 is a flowchart showing the sequence of an interpolation routine.

In step S701, a dust region is determined. The dust region is defined as a region which satisfies all the following conditions:

(1) a region which is darker than a threshold value T2 calculated based on an average luminance Yave and maximum luminance Ymax of pixels falling in a region defined by the center coordinates Di' and radius Ri' (Ri' and Di' calculated by equation (1)):

$$T2=Yave\times 0.6+Ymax\times 0.4$$

(2) a region which does not contact a circle having the radius Ri' from the center coordinates Di'.

(3) a region whose radius value calculated by the above-described equation is equal to or larger than x1 pixels and smaller than x2 pixels with respect to an isolated region of low-luminance pixels selected in (1).

(4) a region containing the center coordinates Di of the circle.

In the embodiment, x1 represents three pixels, and x2 represents 30 pixels. With this setting, only a small isolated region can be handled as a dust region. When no lens pupil position can be accurately acquired, condition (4) may be eased. For example, when the region of interest contains the coordinates of a range of ±3 pixels from the coordinates Di in both the X and Y directions, it is determined as a dust region.

If such a region (portion) exists in an image signal in step S702, the process advances to step S703 to perform dust region interpolation. If no such region exists, the process ends. The dust region interpolation processing in step S703 adopts a known defective region interpolation method. An example of the known defective region interpolation method is pattern replacement disclosed in Japanese Patent Laid-Open No. 2001-223894. In Japanese Patent Laid-Open No. 2001-223894, a defective region is specified using infrared light. In the embodiment, a dust region detected in step S701 is handled as a defective region, and interpolated by normal neighboring pixels by pattern replacement. For a pixel which cannot be interpolated by pattern replacement, p normal pixels are selected sequentially from one closest to the pixel to be interpolated in image data having undergone pattern correction, and the target pixel is interpolated using the average color of them.

In still image dust removal processing, dust correction data is attached to an image in this fashion. The correspondence between dust correction image data and captured image data need not be recorded. Since dust correction data is compact data formed from the position, size, and conversion data (aperture value and distance information of the lens pupil position), the size of captured image data does not become excessively large. Only a region containing pixels designated by dust correction data is interpolated, greatly decreasing the probability of a detection error.

Next, dust correction playback processing for a moving image in the image capturing apparatus having the image processing function in the embodiment will be explained.

Figure 9:
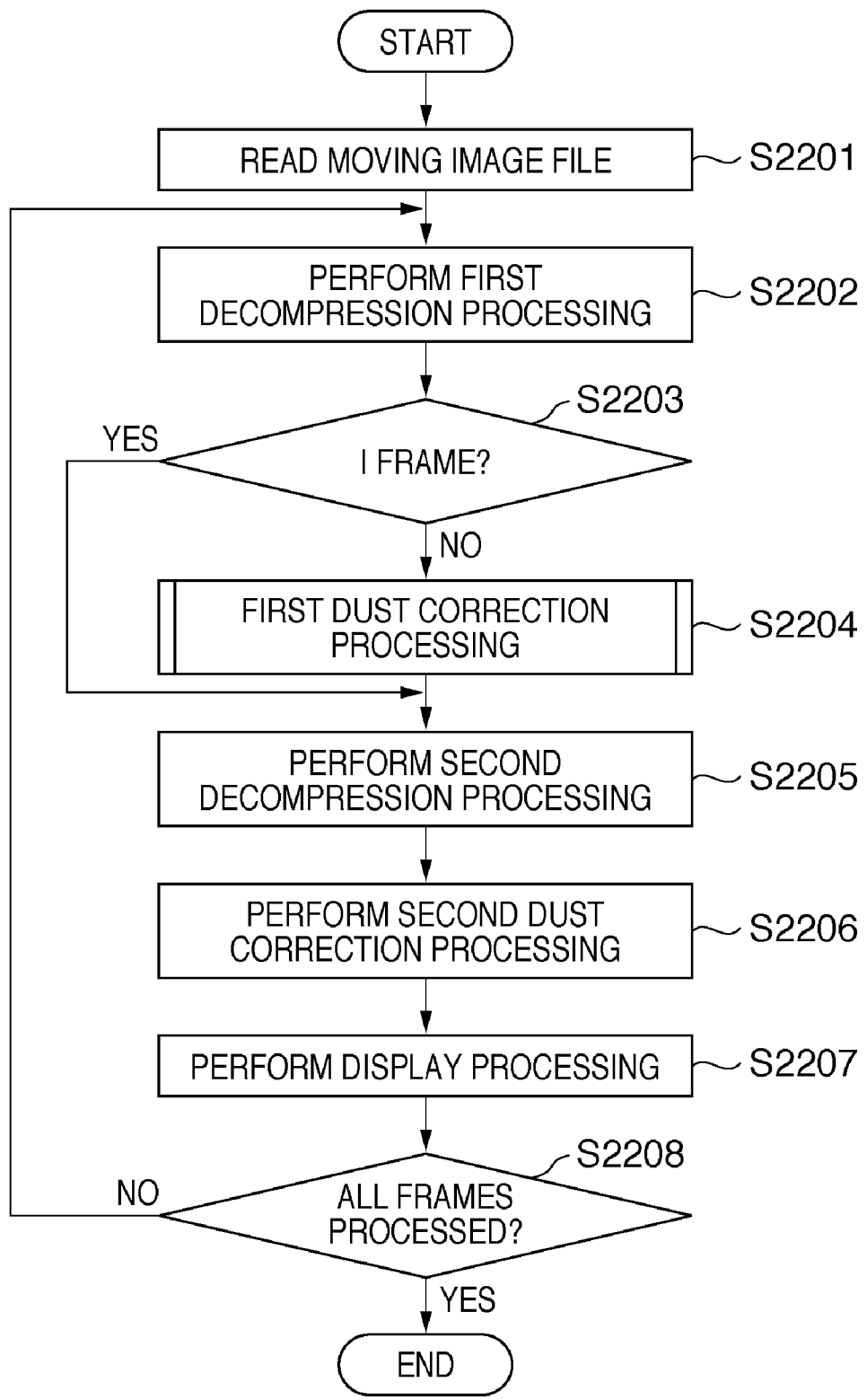
FIG. 9 is a flowchart for explaining a moving image playback operation in the embodiment of the present invention.

FIG. 9 is a flowchart for explaining an operation to play back a moving image by the image capturing apparatus in the embodiment.

If the user designates the moving image playback operation, a moving image file containing dust position correction data is read from the recording medium 200 to the memory 30 of the camera body 100 via the interface 90 in step S2201. For descriptive convenience, moving image data is formed from only I- and P-frames.

Figure 10A:
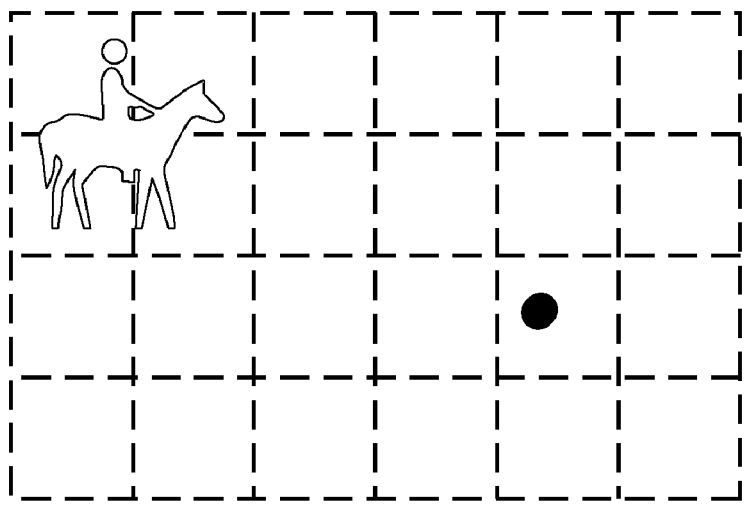
FIGS. 10A to 10E are views for explaining a moving image in encoding in the embodiment of the present invention.
Figure 10B:
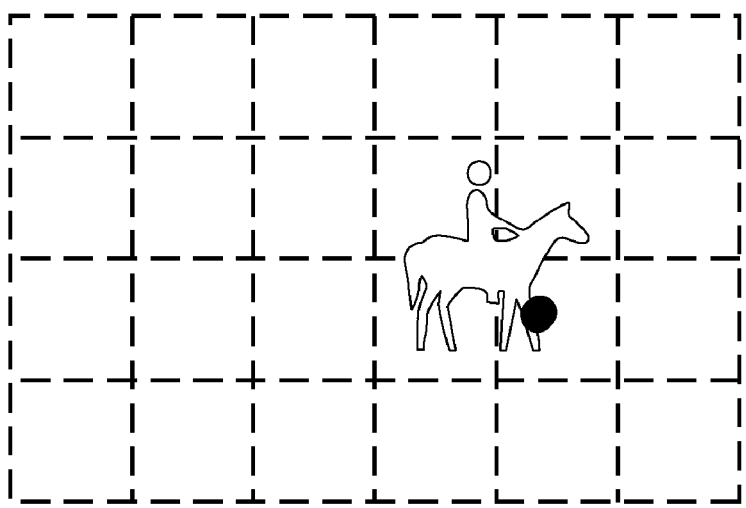

As an example of a moving image file, image data in FIGS. 10A and 10B will be considered. Image data in FIG. 10A is encoded as an I-frame, and that in FIG. 10B is encoded as a P-frame. Actual encoding follows the sequence shown in FIG. 14 to process each macroblock. Broken lines in FIGS. 10A and 10B define macroblocks.

The shadow of dust is captured in the frame, and the dust adheres to the surface of the optical element 14a in front of the image sensing plane. Even if the scene changes, the shadow of dust always appears at the same position in the frame. The dust position is assumed to be included in dust information stored in the header of the moving image file.

Figure 10C:
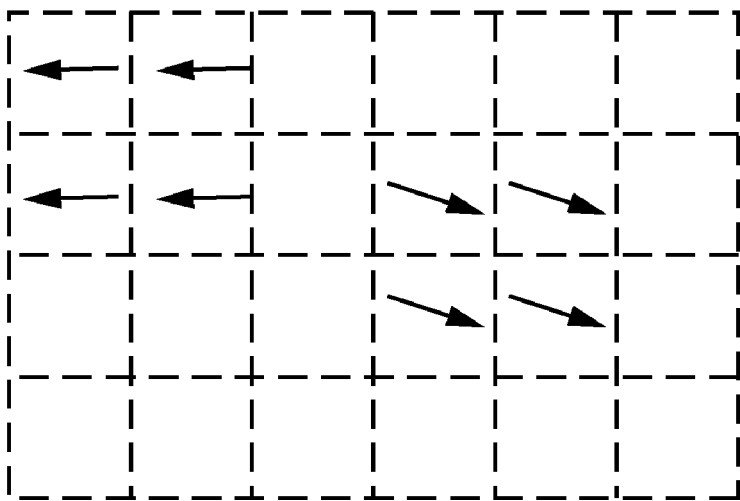
Figure 10D:
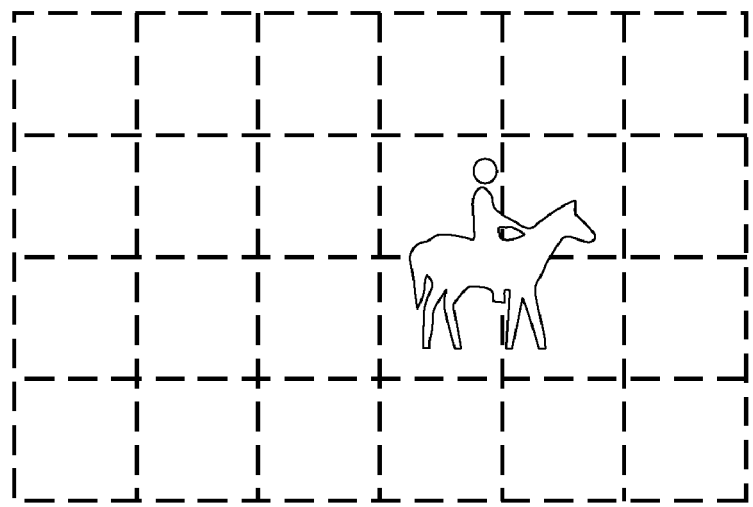
Figure 10E:
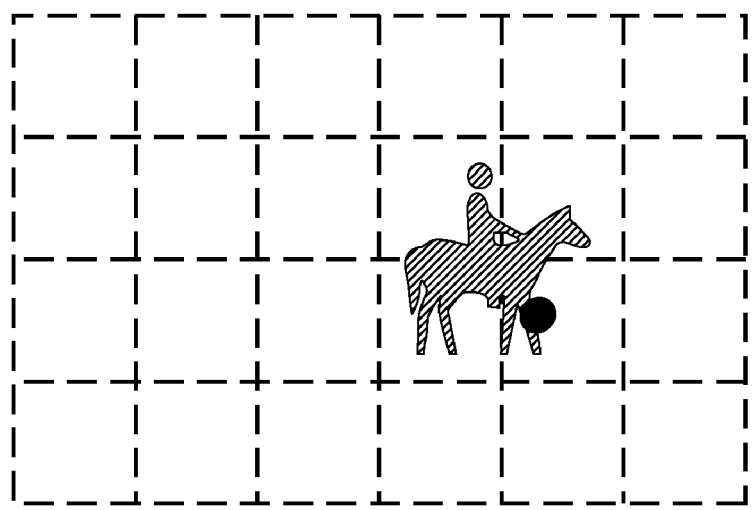
Figure 14:
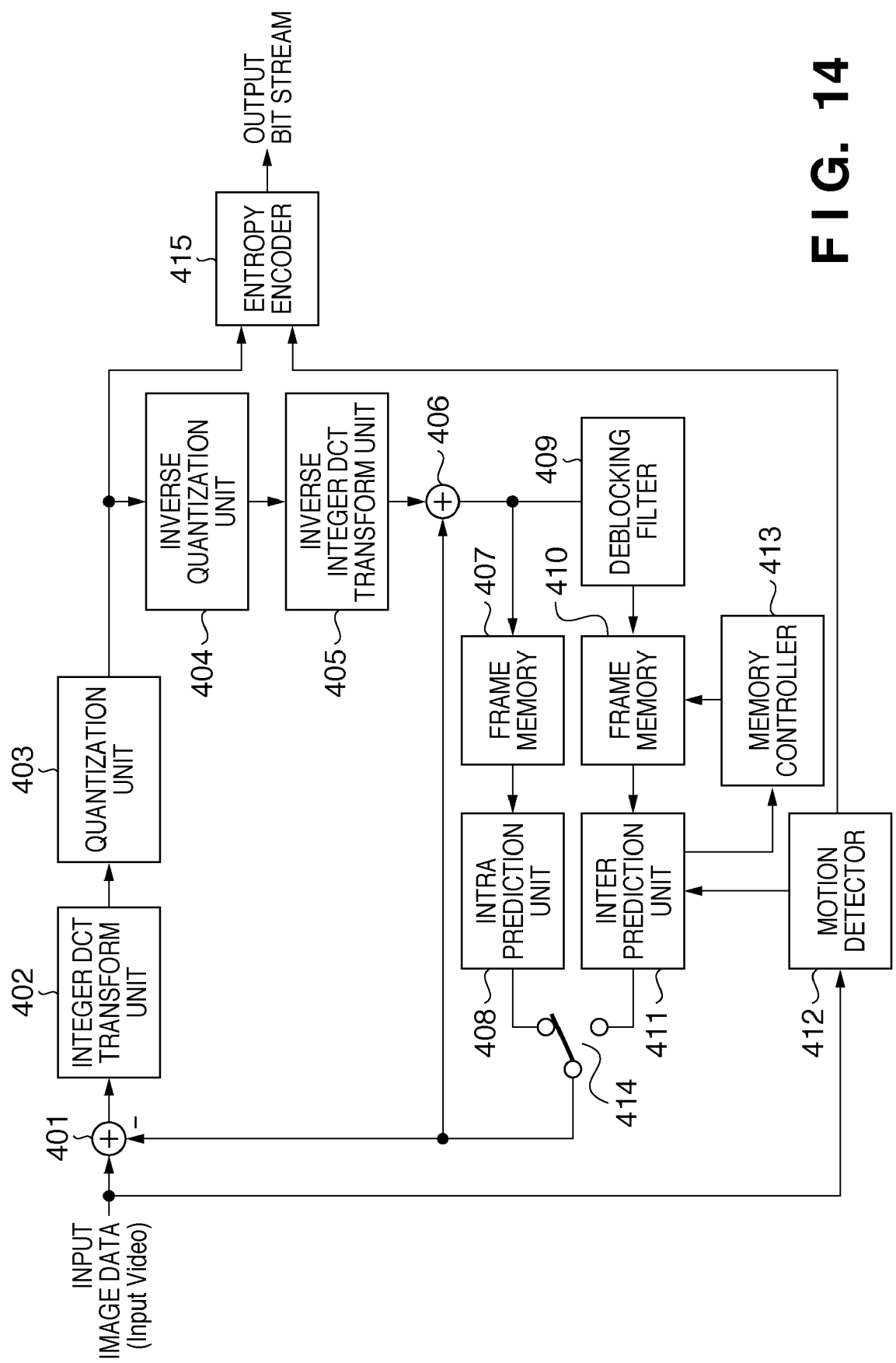
FIG. 14 is a diagram showing the arrangement of an image processing apparatus which compresses image data by H.264.
Figure 19:
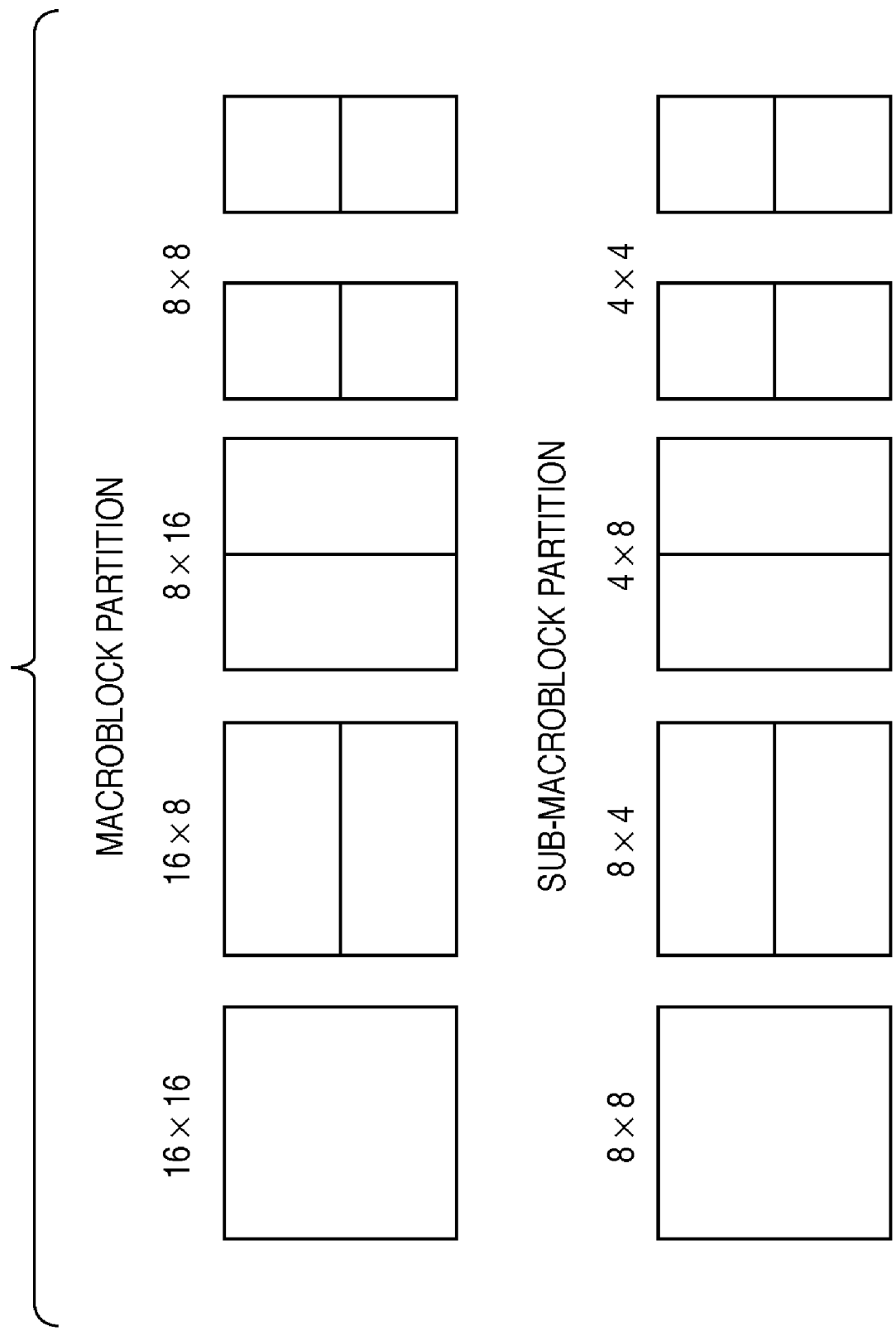
FIG. 19 is a view for explaining partitioning of a macroblock.
Figure 20:
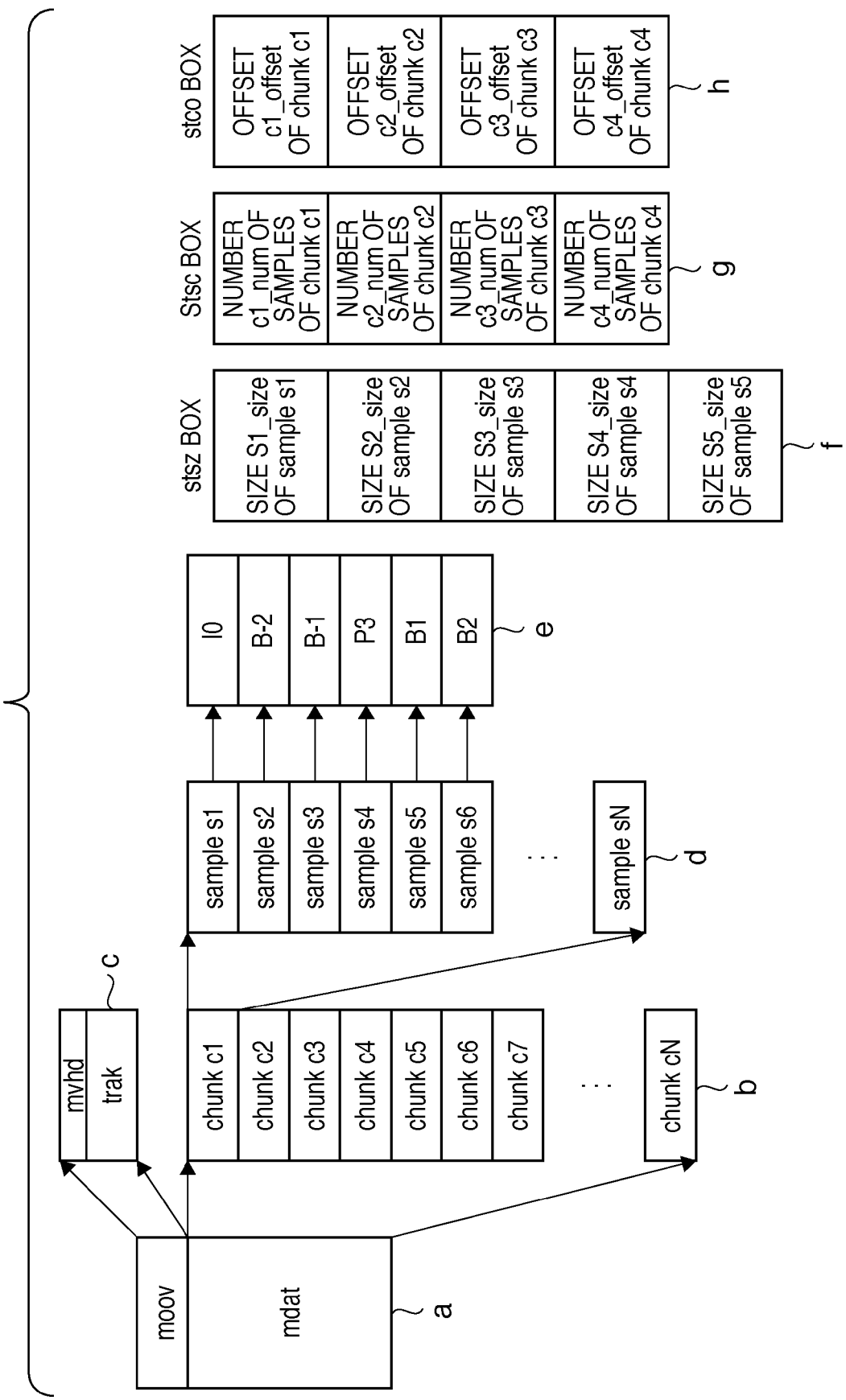
FIG. 20 is a view for explaining the structure of an MP4 file.
Figure 21:
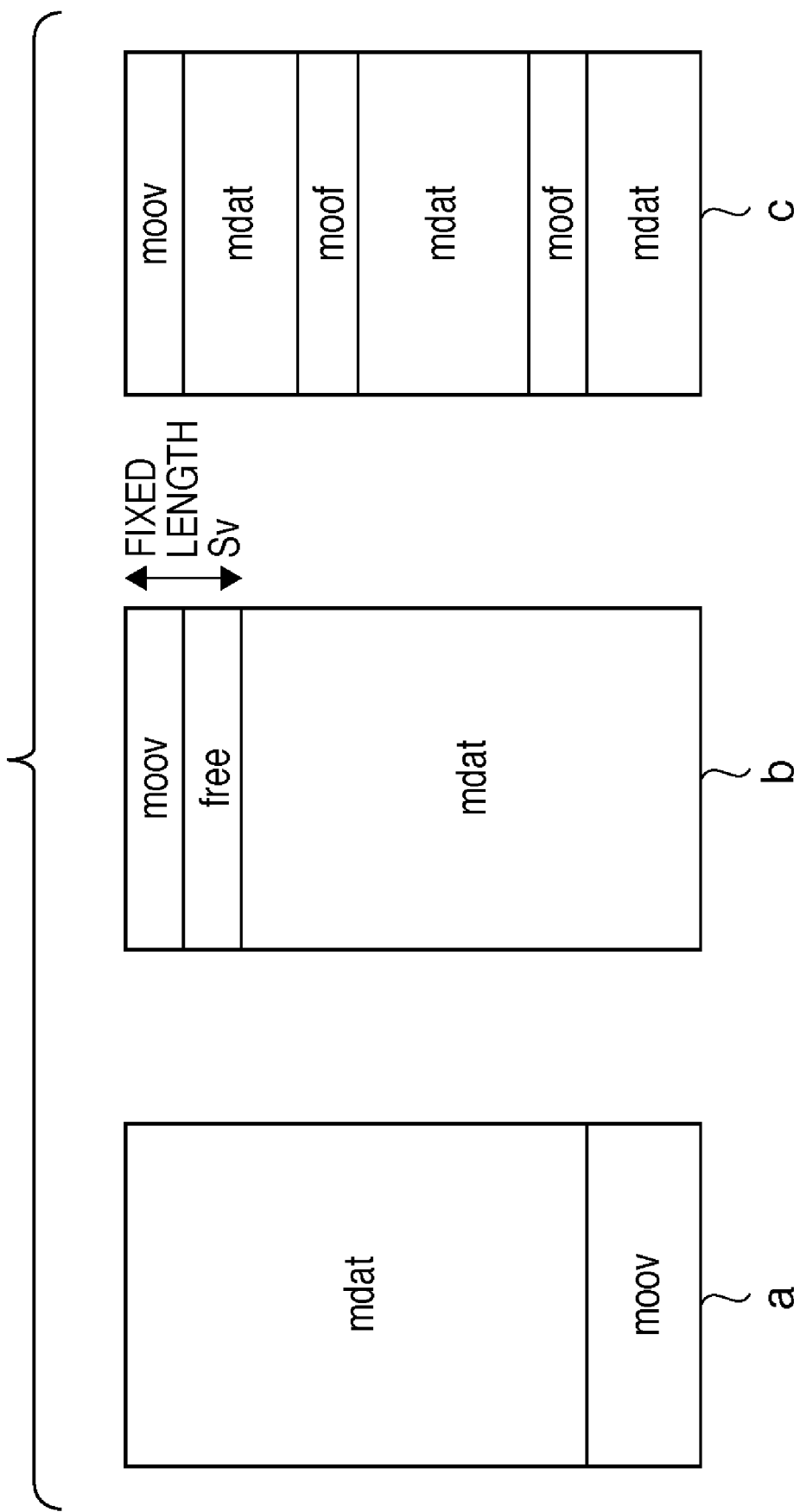
FIG. 21 is a view exemplifying the structure of an MP4 file.

When the image data in FIG. 10B is encoded into a P-frame, a motion detection unit 412 in FIG. 14 outputs a motion vector shown in FIG. 10C, and an inter prediction unit 411 outputs a predicted image shown in FIG. 10D. A subtracter 401 outputs image data shown in FIG. 10E, and an entropy encoder 415 encodes it together with the motion vector in FIG. 10C.

Figure 13:
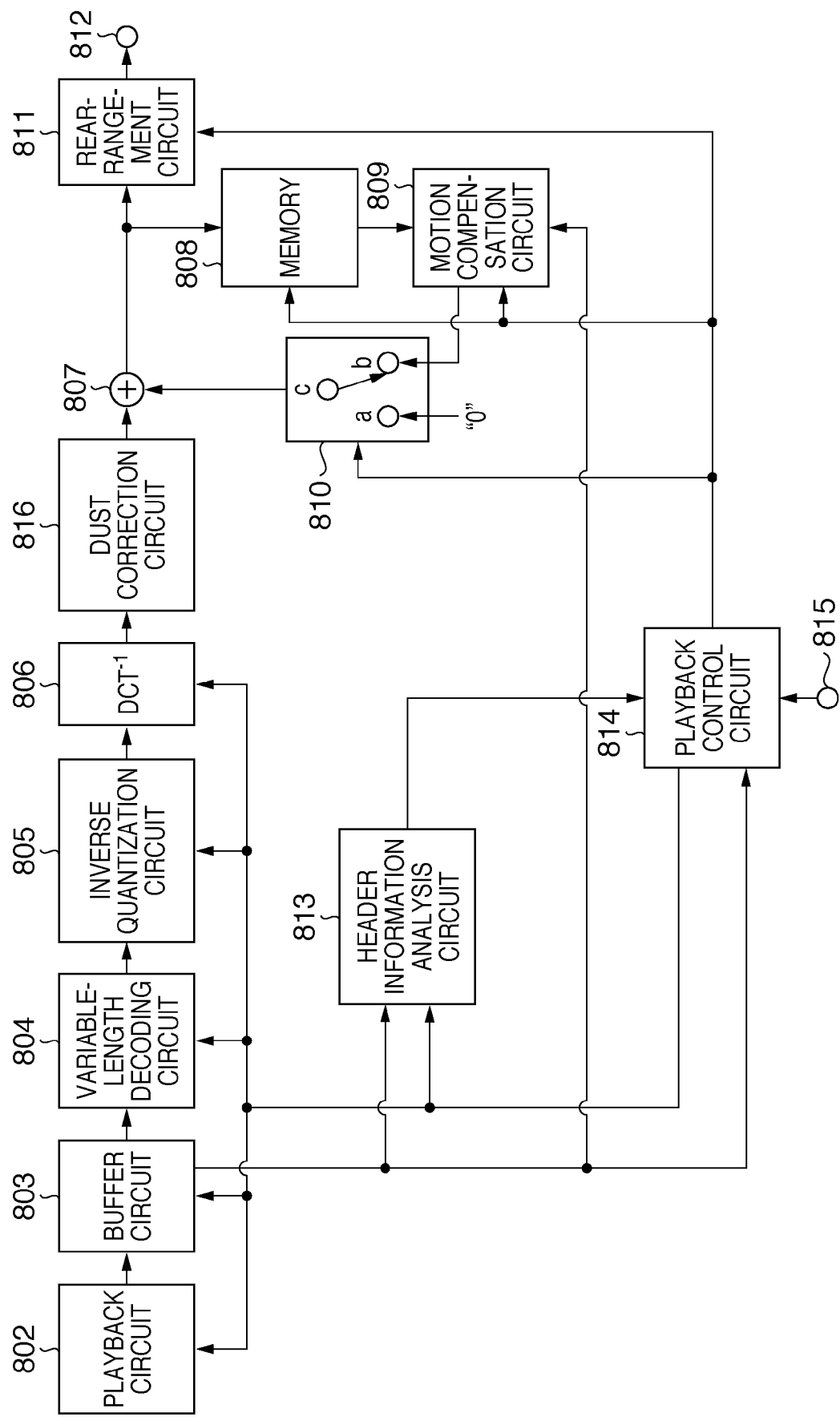
FIG. 13 is a block diagram for explaining a compression/decompression circuit in the embodiment of the present invention.
Figure 22:
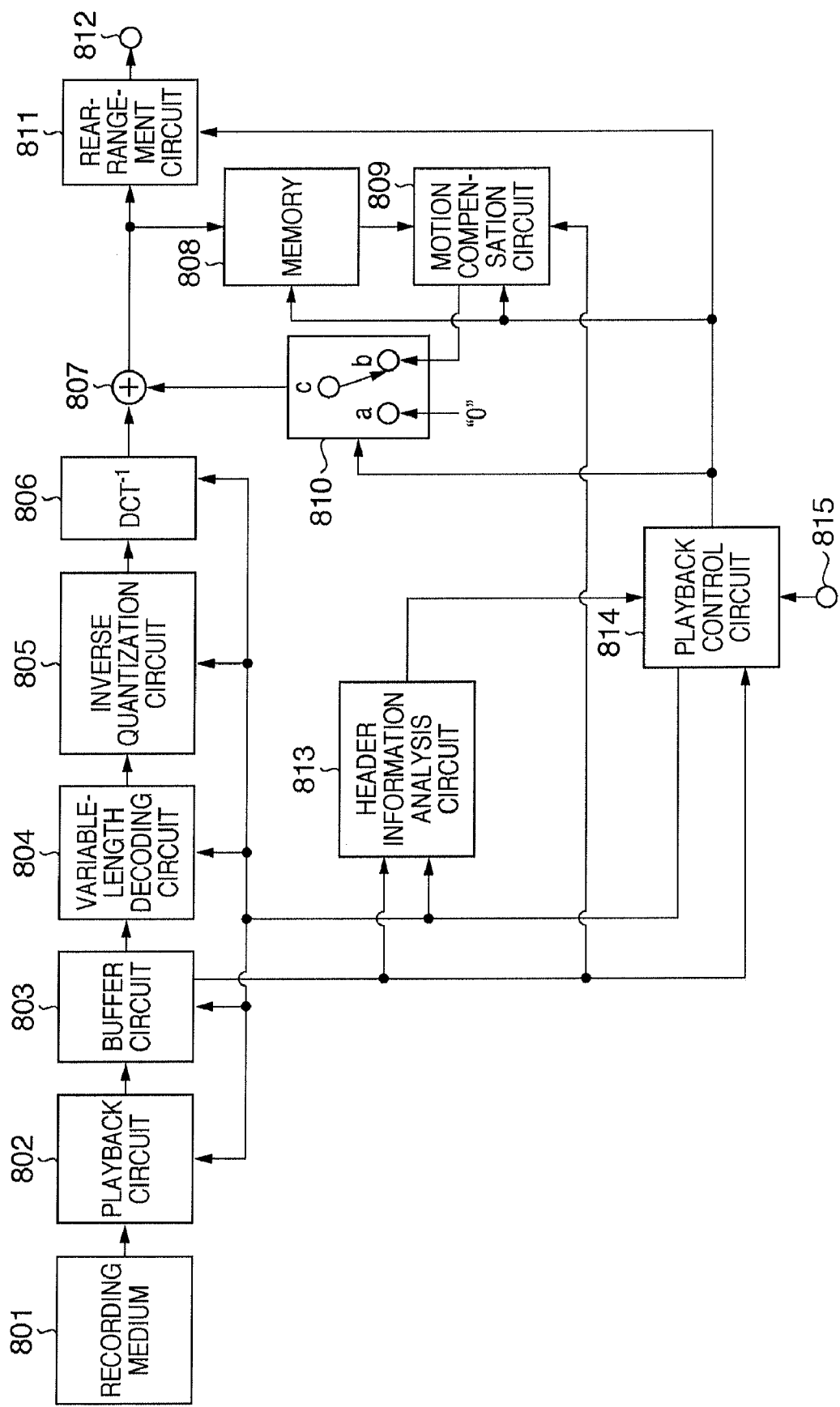
FIG. 22 is a block diagram for explaining a conventional playback apparatus.
Figure 23:
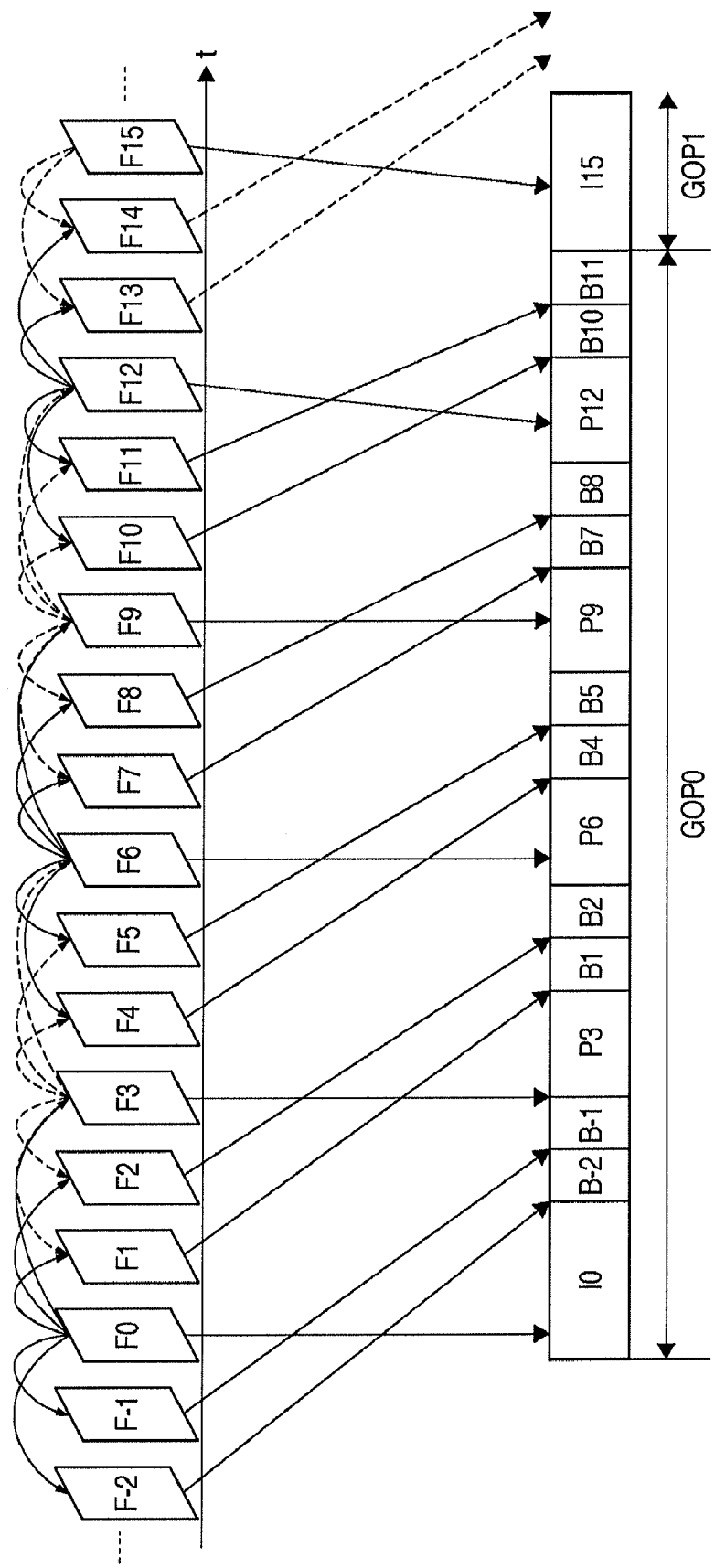
FIG. 23 is a view for explaining the encoding order of frames by a conventional technique.

Referring back to the description of playback processing, in step S2202, the compression/decompression circuit 32 decompresses the moving image file. FIG. 13 shows blocks included in the compression/decompression circuit 32 in association with moving image decompression processing. The respective blocks shown in FIG. 13 are the same as those in FIG. 22 except that a dust correction circuit 816 is added. The decompression processing proceeds according to the sequence explained with reference to FIG. 22. In step S2202, an inverse DCT circuit 806 outputs a predictive-encoded image, and a motion compensation circuit 809 outputs motion-compensated data.

For an I-frame, the inverse DCT circuit 806 outputs an image shown in FIG. 11A, and a switching circuit 810 selects the terminal a to output "0". For a P-frame, the inverse DCT circuit 806 outputs an image shown in FIG. 11B, and the switching circuit 810 selects the terminal b to output an image shown in FIG. 11C as an output from the motion compensation circuit 809.

In step S2203, the type of frame to be processed is determined. If the frame is an I-frame, the process advances to step S2205, and an addition circuit 807 and subsequent circuits execute decompression processing without performing processing (foreign substance removal processing) by the dust correction circuit 816. If the frame is a P-frame, the process advances to step S2204, and the dust correction circuit 816 executes the first dust correction processing.

In step S2204, the dust correction circuit 816 performs the first dust correction processing for the P-frame. In the first dust correction processing, dust correction processing is done by applying dust position information to a predictive-encoded image (FIG. 11B) output from the inverse DCT circuit 806. The dust correction circuit 816 outputs the predictive-encoded image having undergone the first dust correction processing.

Figure 12:
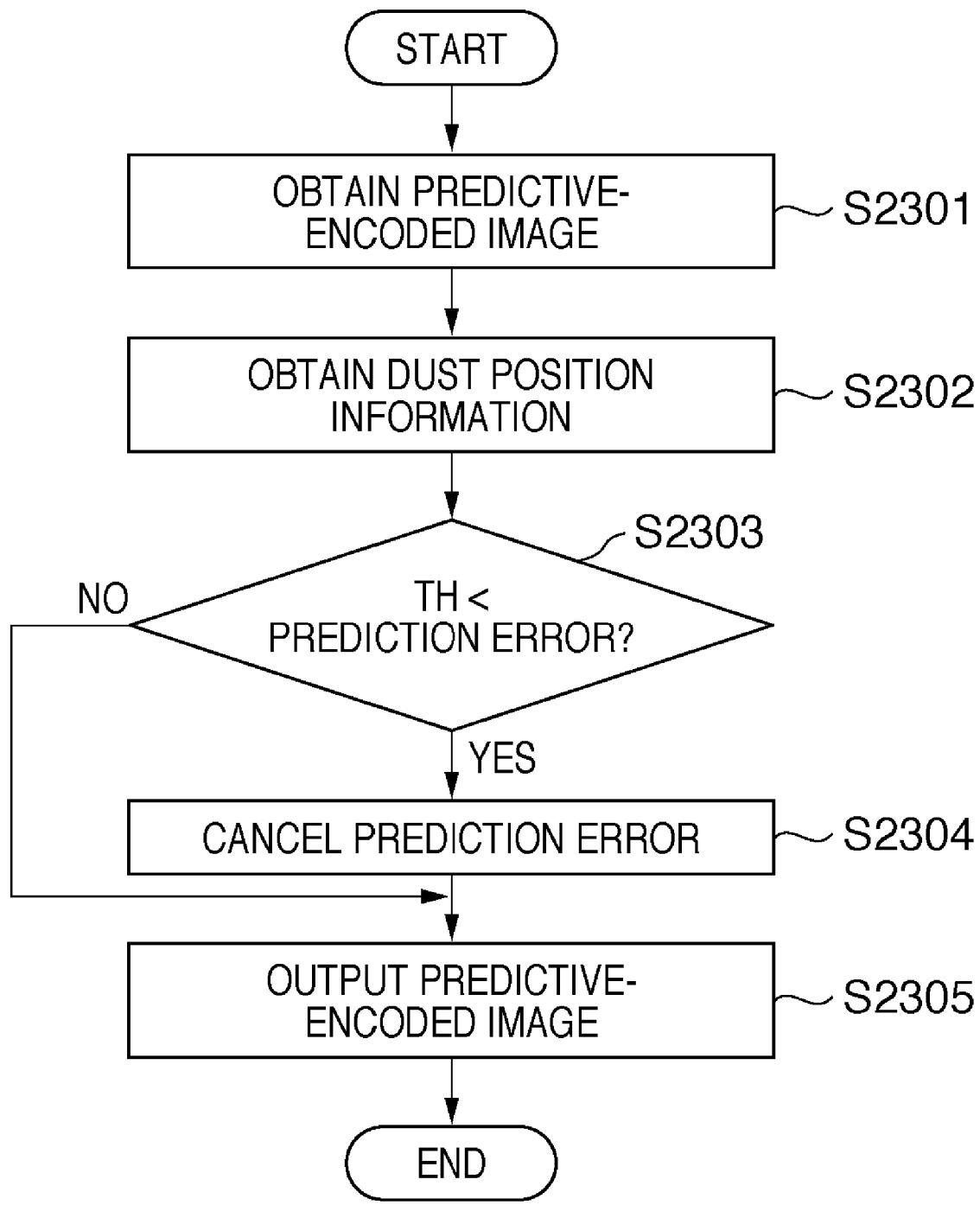
FIG. 12 is a flowchart for explaining an operation to cancel a prediction error in the embodiment of the present invention.

The first dust correction processing will be explained with reference to the flowchart of FIG. 12.

In step S2301, the dust correction circuit 816 receives a predictive-encoded image shown in FIG. 11B.

In step S2302, the dust correction circuit 816 reads dust position information stored in the header of the moving image file to search for a dust position in the predictive-encoded image.

In step S2303, the dust correction circuit 816 obtains the prediction error of a region corresponding to the dust position in the predictive-encoded image. The prediction error includes a prediction error actually generated between frames and one generated from the shadow of dust. The prediction error generated from the shadow of dust is larger than that generated between frames. The dust correction circuit 816 determines that a prediction error exceeding a predetermined threshold TH has arisen from the shadow of dust.

If the dust correction circuit 816 determines that the prediction error is larger than the threshold TH of the dust region and is generated from the shadow of dust, the process advances to step S2304 to cancel the prediction error. If the dust correction circuit 816 determines that the prediction error is equal to or smaller than the threshold TH and is not generated from the shadow of dust, the process advances to step S2305.

Figure 11D:
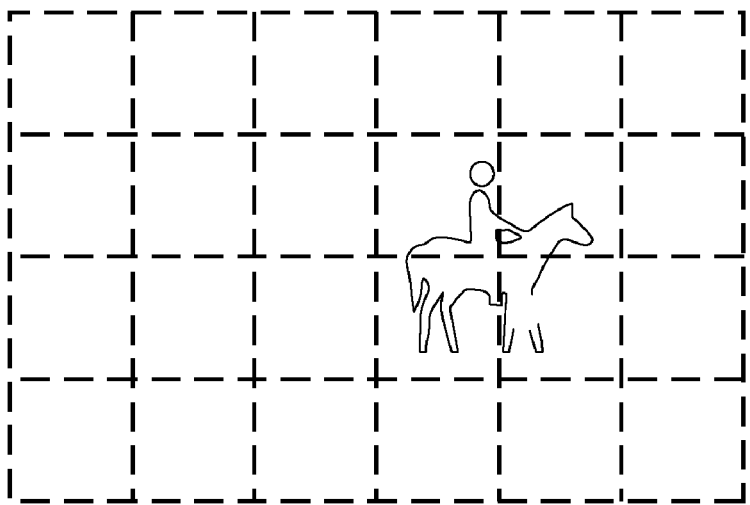

In step S2304, the dust correction circuit 816 performs cancellation processing for the prediction error determined to have arisen from the shadow of dust. When it is determined that the prediction error of the dust region in FIG. 11B is larger than the threshold TH and has arisen from the shadow of dust, the prediction error of the region is canceled by replacing it with "0", as shown in FIG. 11D.

Whether to perform the cancellation processing is determined based on the determination threshold TH as well as dust position information for the following reasons:

(1) To prevent execution of erroneous processing when dust does not actually exist even if the dust is registered in dust position information because it may not exist at the position in shooting.

(2) To prevent execution of erroneous processing for a region actually containing no shadow of dust because dust is represented by a circle in dust position information regardless of the actual dust shape, as described with reference to FIG. 4.

One determination threshold TH may be used, or a plurality of thresholds may also be used based on the density of the shadow of dust because this density changes depending on the aperture value in shooting. For example, the threshold is set low for a dark shadow of dust to remove it as much as possible, and high for a faint shadow of dust not to cancel prediction errors other than one caused by the shadow of dust.

The determination threshold TH may be a fixed value or set for every region to be processed. For example, when the prediction error of the dust region is large, the target frame is determined to be less correlated with the reference frame. In this case, the threshold TH is set high not to cancel a prediction error. In contrast, when the prediction error is small, the target frame is determined to be highly correlated with the reference frame. In this case, the threshold TH is set low to remove the shadow of dust as much as possible.

Also, prediction errors around the dust region may be considered. When peripheral prediction errors are large, the target frame is determined to be less correlated with the reference frame. In this case, the threshold TH is set high not to cancel a prediction error. To the contrary, when peripheral prediction errors are small, the target frame is determined to be highly correlated with the reference frame. In this case, the threshold TH is set low to remove the shadow of dust as much as possible.

As the prediction error cancellation operation, the prediction error is replaced with "0", but need not always be replaced with "0". For example, a prediction error of a predetermined level may be canceled in accordance with the density of the shadow of dust or in consideration of the prediction error of a dust region or prediction errors around a dust region.

A dust region may overlap a plurality of macroblocks. In this case, the same threshold TH may be applied to all macroblocks, or a threshold TH optimum for each macroblock may also be applied based on the above-mentioned determination. As for the prediction error cancellation operation, the same cancellation operation may be done for all macroblocks, or cancellation processing optimum for each macroblock may also be performed.

In step S2305, the dust correction circuit 816 outputs a predictive-encoded image whose prediction error has been canceled.

The first dust correction processing has been described.

Referring back to the sequence of FIG. 9, in step S2205, the addition circuit 807 adds the predictive-encoded image and the motion-compensated data output from the motion compensation circuit 809. The resultant data undergoes decompression processing.

When processing an I-frame, the switching circuit 810 selects the terminal a. The addition circuit 807 receives data in FIG. 11A and "0", and outputs the data in FIG. 11A.

When processing a P-frame, the switching circuit 810 selects the terminal b. The addition circuit 807 receives data in FIGS. 11D and 11C, and outputs data in FIG. 11E.

Since the prediction error of the dust region has been canceled in step S2304, addition processing by the addition circuit 807 can remove the shadow of dust from the P-frame.

In step S2206, the shadow of dust not subjected to the first dust correction processing in step S2204 undergoes the second dust correction processing. The second dust correction processing is done for an image which has been decompressed in step S2205 and generated as frame data. In the second dust correction processing, the dust removal circuit 31 performs the same processing as the foregoing dust correction processing for a still image.

Decompressed data of the I-frame in FIG. 11A does not undergo the first dust correction processing, so dust data in the frame is corrected based on dust position information contained in the file. FIG. 11F shows a corrected image.

Figure 11E:
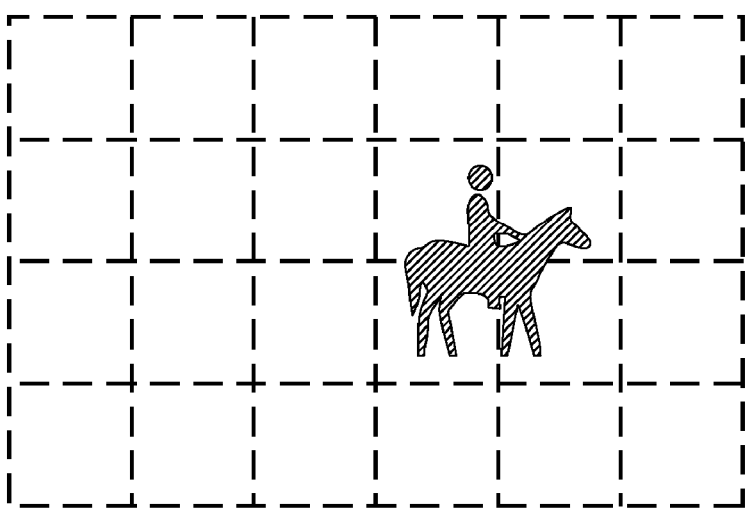
Figure 11F:
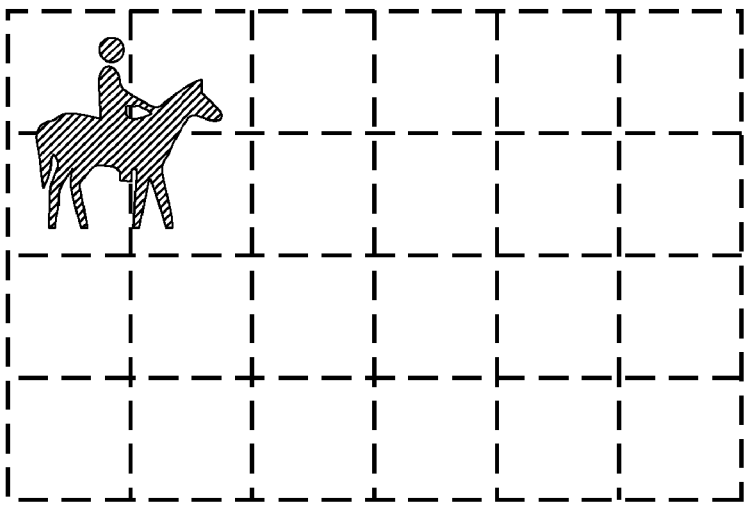

Decompressed data of the P-frame in FIG. 11E has undergone the first dust correction processing to remove the shadow of dust. This data need not undergo dust correction processing in step S2206, shortening the processing time of step S2206.

In step S2207, display processing is executed. The dust-corrected moving image is resized to an image size optimum for the image display unit 28, and stored in the image display memory 24. Then, the moving image is read out and displayed on the image display unit 28 under the control of the memory control circuit 22.

Finally in step S2208, it is determined whether all the frames have been processed. If it is determined that all the frames have been processed, the playback processing ends. If all the frames have not been processed, the process returns to step S2202 to repeat the same operation until all the frames have been processed.

The dust correction playback processing is executed according to this sequence.

For descriptive convenience, the embodiment has described a moving image formed from I- and P-frames. However, the same processing can also be executed for B-frames, and the present invention is applicable to many moving image formats.

As described above, according to the embodiment, only I-frames undergo time-consuming dust correction processing using peripheral images when playing back a moving image file while performing dust correction processing using dust position information. In P-frames, the shadow of dust is removed by canceling the prediction error of a region given by the dust position information from a predictive-encoded image. This can increase the operation speed in playback and play back a high-quality moving image in which the shadow of dust is corrected.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-222791, filed Aug. 29, 2008, which is hereby incorporated by reference herein in its entirety.

What is claimed is:

1. An image processing apparatus which corrects, based on foreign substance information containing information on a position and size of a foreign substance adhered to an optical element arranged in front of an image sensor in an image capturing apparatus which has captured moving image data constituted by frames, a shadow of the foreign substance in the moving image data generated by performing predictive encoding by referring to image data of a different input frame, the image processing apparatus comprising:

a moving image decompression unit configured to decompress an image of each frame by obtaining difference information representing a difference between frames from the moving image data; and a correction unit configured to correct the obtained difference information in the case that the difference information obtained for a region containing the shadow of the foreign substance represented by the foreign substance information is determined to be larger than a predetermined threshold.

2. The apparatus according to claim 1, wherein the information representing the difference between frames includes a prediction error.

3. The apparatus according to claim 1, further comprising a foreign substance removal unit configured to remove, from a frame image obtained by said moving image decompression unit, a shadow of a foreign substance that is contained in the foreign substance information and has not been corrected by said correction unit.

4. The apparatus according to claim 1, wherein a frame processed by said correction unit includes a frame encoded by referring to image data of a different frame.

5. The apparatus according to claim 1, wherein correction processing by said correction unit includes processing to replace the difference between frames with 0.

6. The apparatus according to claim 1, wherein correction processing by said correction unit includes either processing to add a predetermined value to the difference between frames or processing to subtract a predetermined value from the difference between frames.

7. The apparatus according to claim 1, wherein said correction unit is configured to set at least one threshold for the region containing the shadow of the foreign substance represented by the foreign substance information.

8. A method of controlling an image processing apparatus for correcting, based on foreign substance information containing information on a position and size of a foreign substance adhered to an optical element arranged in front of an image sensor in an image capturing apparatus which has captured moving image data constituted by frames, a shadow of the foreign substance in the moving image data generated by performing predictive encoding, the method comprising:

a moving image decompression step of decompressing an image of each frame by obtaining difference information representing a difference between frames from the moving image data; and a correction step of correcting the obtained difference information in the case that the difference information obtained for a region containing the shadow of the foreign substance represented by the foreign substance information is determined to be larger than a predetermined threshold.

9. A computer-readable storage medium that stores a program for causing a computer to execute a control method defined in claim 8.

* * * * *